United States Patent
Futagami et al.

(10) Patent No.: US 6,754,665 B1
(45) Date of Patent: Jun. 22, 2004

(54) INFORMATION PROCESSING APPARATUS, INFORMATION PROCESSING METHOD, AND STORAGE MEDIUM

(75) Inventors: Motomasa Futagami, Kanagawa (JP); Youji Kawamoto, Tokyo (JP); Hirofumi Kawamura, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 09/592,977

(22) Filed: Jun. 13, 2000

(30) Foreign Application Priority Data

Jun. 24, 1999 (JP) .......................................... P11-177819
Jun. 24, 1999 (JP) .......................................... P11-177820

(51) Int. Cl.[7] ............................................. G06F 17/30
(52) U.S. Cl. ....................................................... 707/102
(58) Field of Search ........................................ 707/102

(56) References Cited

U.S. PATENT DOCUMENTS

| | | | | |
|---|---|---|---|---|
| 5,191,611 A | * | 3/1993 | Lang | 705/53 |
| 5,510,978 A | * | 4/1996 | Colgan | 705/12 |
| 5,748,738 A | * | 5/1998 | Bisbee et al. | 713/176 |
| 5,802,156 A | * | 9/1998 | Felger | 379/114.14 |
| 5,867,821 A | * | 2/1999 | Ballantyne et al. | 345/970.1 |
| 5,930,801 A | * | 7/1999 | Falkenhainer et al. | 707/103 R |
| 6,006,227 A | * | 12/1999 | Freeman et al. | 707/102 |
| 6,052,122 A | * | 4/2000 | Sutcliffe et al. | 345/751 |
| 6,064,666 A | * | 5/2000 | Willner et al. | 370/352 |
| 6,119,229 A | * | 9/2000 | Martinez et al. | 713/200 |
| 6,134,548 A | * | 10/2000 | Gottsman et al. | 705/26 |
| 6,138,149 A | * | 10/2000 | Ohmura | 705/26 |
| 6,195,651 B1 | * | 2/2001 | Handel et al. | 707/2 |
| 6,199,082 B1 | * | 3/2001 | Ferrel et al. | 707/515 |
| 6,199,099 B1 | * | 3/2001 | Gershman et al. | 345/966 |
| 6,202,062 B1 | * | 3/2001 | Cameron et al. | 707/102 |
| 6,205,478 B1 | * | 3/2001 | Sugano et al. | 709/223 |
| 6,269,369 B1 | * | 7/2001 | Robertson | 707/10 |
| 6,317,718 B1 | * | 11/2001 | Fano | 705/1 |
| 6,405,224 B1 | * | 6/2002 | Van Der Meer | 715/513 |
| 6,477,563 B1 | * | 11/2002 | Kawamura et al. | 709/202 |
| 6,487,557 B1 | * | 11/2002 | Nagatomo | 707/102 |
| 2001/0014868 A1 | * | 8/2001 | Herz et al. | 705/14 |

* cited by examiner

*Primary Examiner*—Wayne Amsbury
(74) *Attorney, Agent, or Firm*—Sonnenschein, Nath & Rosenthal LLP

(57) ABSTRACT

A technique is disclosed which makes it possible to easily control access to personal information of a user. A management server stores personal information such as a name, telephone number, address, and electronic mail address of each user. For example, if a user of a computer transmits a request command to the management server to transmit personal information of a user of a portable telephone device, the management server determines, in accordance with access restriction information, whether or not providing of the personal information of the user of the portable telephone is restricted. If the providing of the personal information requested by the user of the computer is restricted, the management server inquires of the user of the portable telephone device, who is the owner of the personal information, whether to give permission to provide the personal information. If permission is given, the management server provides the personal information to the user of the computer.

23 Claims, 25 Drawing Sheets

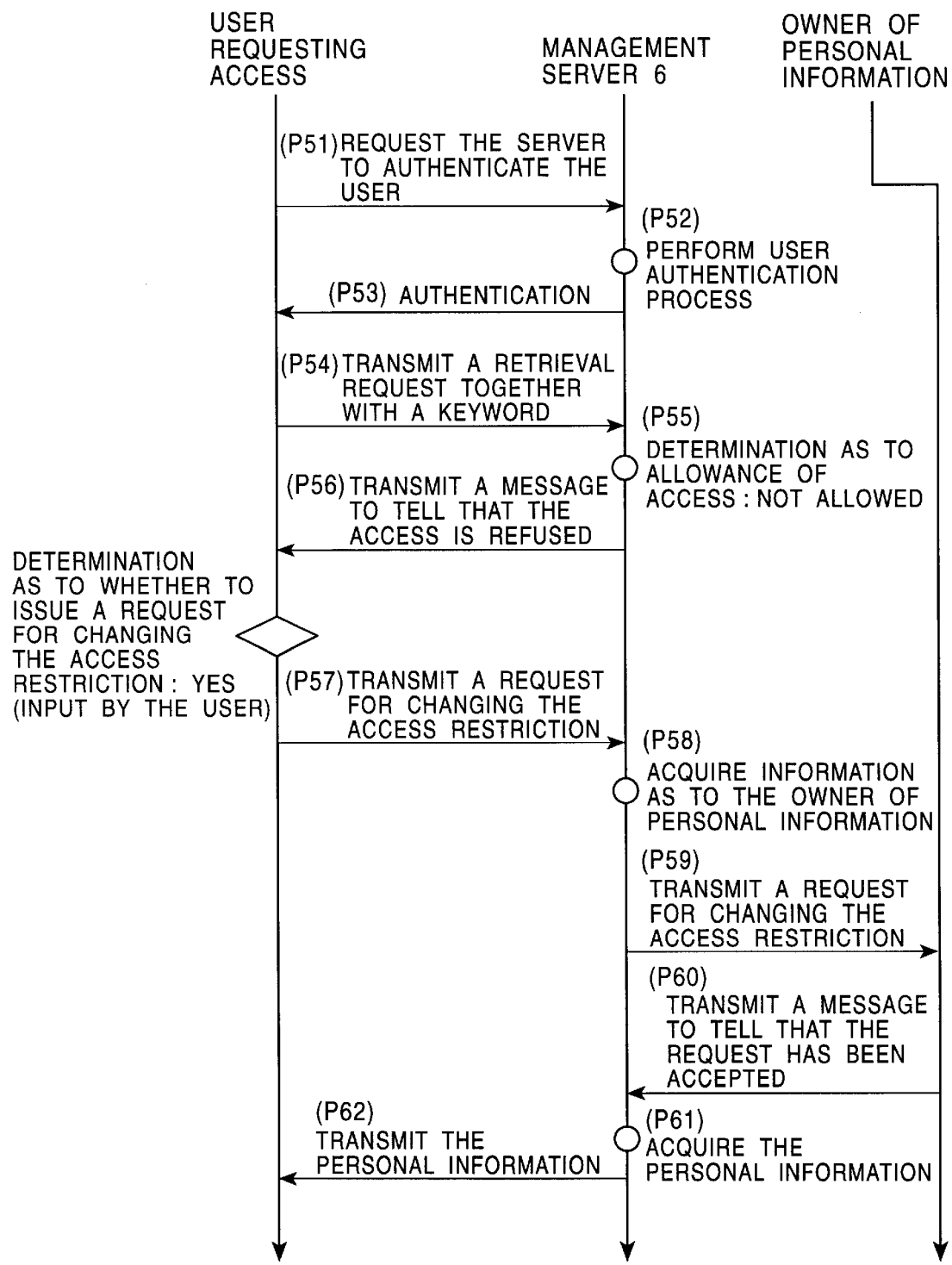

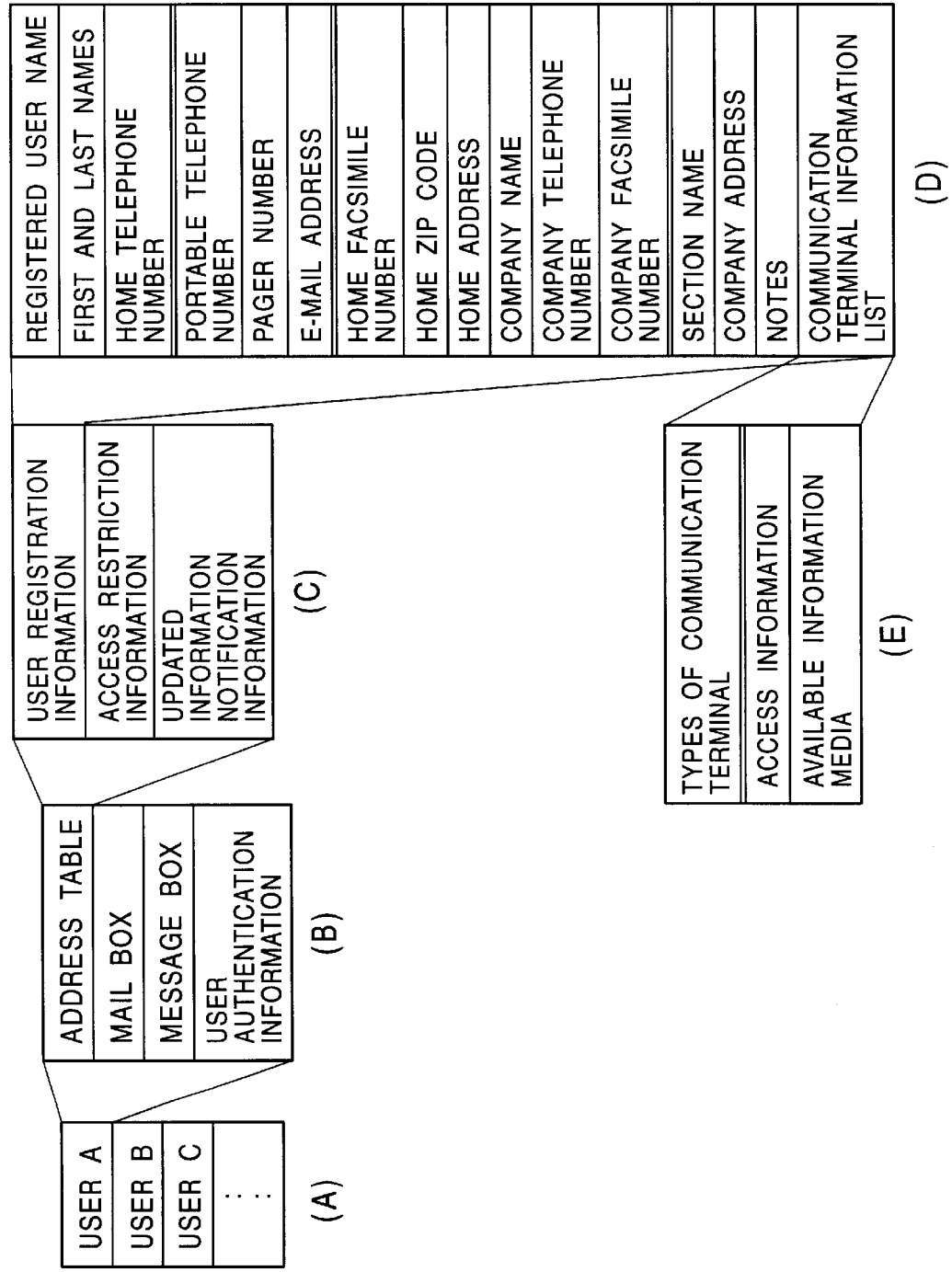

FIG. 23

| ACCESS RESTRICTION INFORMATION | REGISTERED USER NAME : USER A, USER B |
|---|---|
| | FIRST AND LAST NAMES : USER A, USER B |
| | HOME TELEPHONE NUMBER : USER A, USER B |
| | PORTABLE TELEPHONE NUMBER : USER A, USER B |
| | PAGER NUMBER : USER A, USER B |
| | E-MAIL ADDRESS : USER A, USER B |
| | HOME FACSIMILE NUMBER : NOBODY |
| | HOME ZIP CODE : NOBODY |
| | HOME ADDRESS : NOBODY |
| | COMPANY NAME : USER A |
| | COMPANY TELEPHONE NUMBER : USER A |
| | COMPANY FACSIMILE NUMBER : USER A |
| | SECTION NAME : USER A |
| | COMPANY ADDRESS : USER A |
| | NOTES : NOBODY |
| | COMMUNICATION TERMINAL INFORMATION LIST : USER A, USER B |

FIG. 24

| UPDATED INFORMATION NOTIFICATION INFORMATION | REGISTERED USER NAME : USER A, USER B |
| --- | --- |
| | FIRST AND LAST NAMES : USER A, USER B |
| | HOME TELEPHONE NUMBER : USER A, USER B |
| | PORTABLE TELEPHONE NUMBER : USER A, USER B |
| | PAGER NUMBER : USER A, USER B |
| | E-MAIL ADDRESS : USER A, USER B |
| | HOME FACSIMILE NUMBER : NOBODY |
| | HOME ZIP CODE : NOBODY |
| | HOME ADDRESS : NOBODY |
| | COMPANY NAME : USER A |
| | COMPANY TELEPHONE NUMBER : USER A |
| | COMPANY FACSIMILE NUMBER : USER A |
| | SECTION NAME : USER A |
| | COMPANY ADDRESS : USER A |
| | NOTES : NOBODY |
| | COMMUNICATION TERMINAL INFORMATION LIST : USER A, USER B |

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium, and more particularly, to an information processing apparatus, an information processing method, and a storage medium, which allow personal information of a user, such as a name, address, telephone number, and electronic mail address, to be recorded in an address table or the like and which also make it possible to easily control the access of another user to the personal information.

2. Description of the Related Art

A recent reduction in cost of information communication devices allows many users to record and mange personal information on an information communication device such as a portable telephone device, a computer, or a PDA (Personal Digital (Data) Assistant), wherein the personal information may include names, addresses, telephone numbers, and electronic mail addresses of users themselves and/or friends or acquaintances.

FIG. 1 illustrates an example of a communication system including such information communication devices.

In FIG. 1, computers 1 and 2 are connected to an in-house LAN (local area network) 12 in a certain company. The LAN 12 is connected to the Internet 11. Computers 3 and 4 are connected to an ISP (Internet service provider) 14 via a public telephone network 13 so that they can access the Internet 11. A portable telephone device 5 can access the Internet 11 via a portable telephone wireless network (including base stations and the like) 15.

The Internet 11 provides various services including an electronic mail (E-mail) service, whereby users of the computers 1 to 4 or the portable telephone device 5 can send an electronic mail to each other via the Internet 11.

An application program for sending/receiving electronic mails is generally called a mailer. In general, the mailer has a table, called an address table, for managing personal information. The address table is used by a user to record personal information such as names and electronic mail addresses of other users.

The recording of personal information into address tables has to be performed by respective users themselves. This job is troublesome for users.

Although the mailer has the capability of extracting the electronic mail address of the sender of a received electronic mail and recording the extracted electronic mail address in the address table, the other items of personal information such as a telephone number or a company name have to be input by a user.

Telephone devices such as a portable telephone device 5 has the capability of recording telephone numbers of other users into an address table by using the telephone number notification service provided by the ISDN (Integrated Service Digital Network). However, even in this case, other items of personal information have to be input by the respective users of the telephone devices.

SUMMARY OF THE INVENTION

Thus, the object of the present invention is to solve the problems described above.

According to an aspect of the present invention, there is provided an information processing apparatus which acquires personal information from an information providing apparatus serving to provide personal information of a user, by means of transmitting a keyword used to retrieve personal information to the information providing apparatus; requesting the information providing apparatus to retrieve personal information using the keyword; receiving personal information corresponding to the keyword from the information providing apparatus; and recording the personal information received from the information providing apparatus.

According to another aspect of the present invention, there is provided an information processing apparatus which provides personal information of a user in response to a request issued by a client terminal in such a manner that when personal information described in a personal information database is updated, information as to updating of the personal information is provided to a client terminal which has issued, in the past, a request for retrieval of that personal information.

According to still another aspect of the present invention, there is provided an information processing apparatus which provides personal information of a user in response to a request issued by a client terminal, by means of receiving a request for personal information from the client terminal; determining whether providing of personal information requested by the client terminal is permitted or restricted, on the basis of permission/restriction information representing whether providing of the personal information is permitted or restricted; when the client terminal issues a request for personal information, if the providing of the personal information is not permitted or is restricted, inquiring of the owner of the personal information whether or not to give permission as to the providing of the personal information; and providing personal information to the client terminal when the owner of the personal information gives permission to provide the personal information.

According to still another aspect of the present invention, there is provided an information processing apparatus which acquires personal information of a user from an information providing apparatus serving to provide personal information of a user, by means of performing inquiry in such a manner that when a request is issued to the information providing apparatus to provide the personal information, if the providing of the personal information is not permitted or is restricted, a request is issued to the information providing means to inquire of the owner of the personal information whether or not to give permission as to the providing of said personal information.

BRIEF DESCRIPTION OF THE DRAWINGS

FIG. 21 is a schematic diagram illustrating a communication process between the management server and an access requester and an owner of personal information;

FIG. 22A is a schematic diagram illustrating the format of personal information described in a personal information database stored in the management server, FIG. 22B illustrates the contents of personal information, FIG. 22C illustrates the contents of an address table, FIG. 22D illustrates the contents of user registration information, and FIG. 22E illustrates the contents of a communication terminal information list;

FIG. 23 is a schematic diagram illustrating the details of access restriction information;

FIG. 24 is a schematic diagram illustrating the details of update notification information;

DESCRIPTION OF THE PREFERRED EMBODIMENTS

Figure 1:
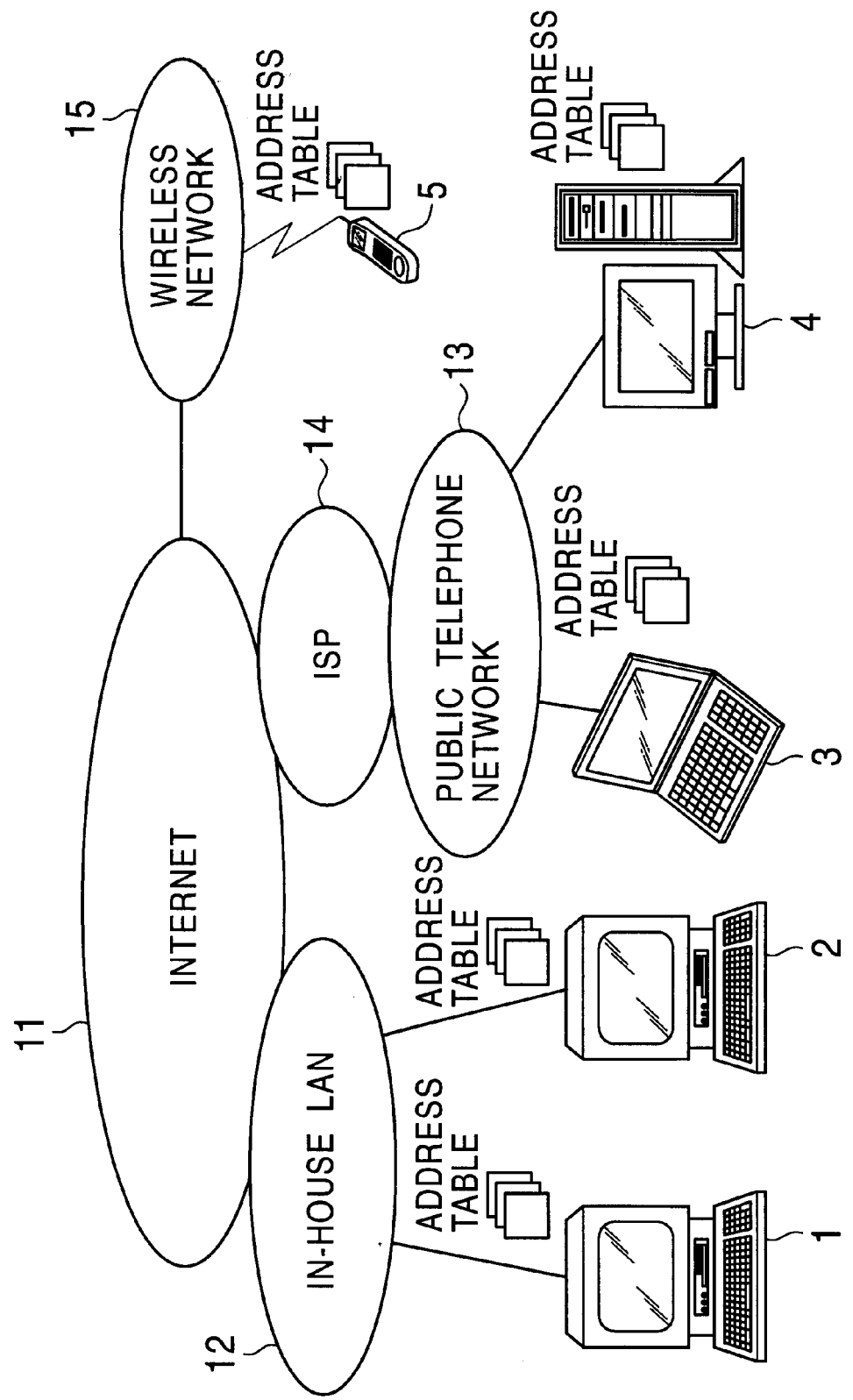
FIG. 1 is a schematic diagram illustrating an example of a conventional communication system.
Figure 2:
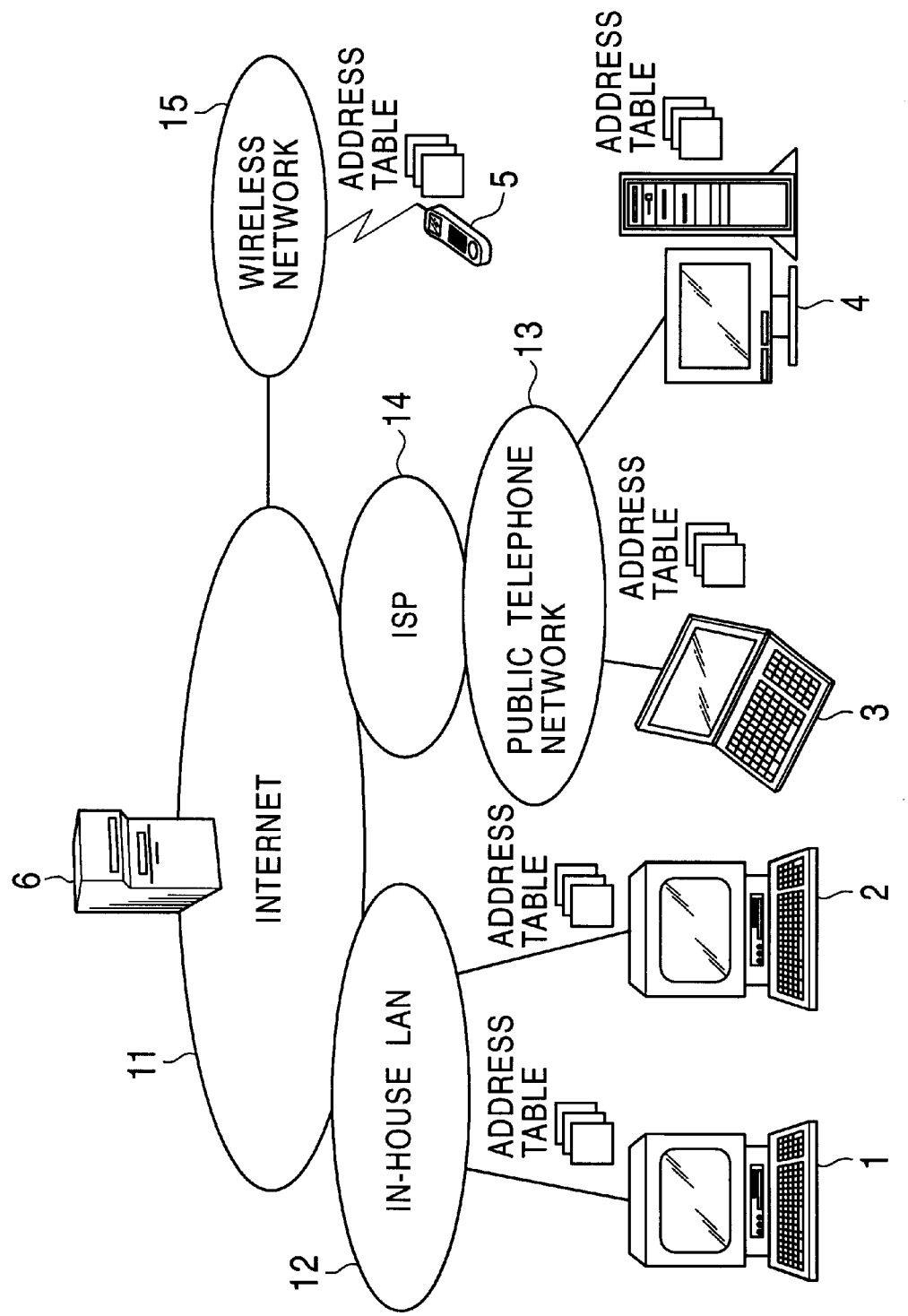
FIG. 2 is a schematic diagram illustrating the configuration of a communication system according to an embodiment of the present invention.

FIG. 2 illustrates the configuration of a communication system according to an embodiment of the present invention. In FIG. 2, similar parts to those in FIG. 1 are denoted by similar reference numerals and they are not described in further detail, unless required. The communication system shown in FIG. 2 is basically similar to that shown in FIG. 1 except that it further includes a management server 6 connected to the Internet 11.

The management server 6 (information providing apparatus) manages personal information of all users of computers 1–4, portable telephone device 5, and other client terminals which are not shown in FIG. 2, in terms of, for example, names, telephone numbers, addresses, dates of birth, and electronic mail addresses.

If the management server 6 receives personal information from any user of the computers 1–4 or the portable telephone device 5, the management server 6 enters the received personal information into a database. On the other hand, if personal information of a certain user is requested by any of the computers 1–4 or the portable telephone device 5, the management server 6 provides the requested personal information to the device which has issued the request.

In the communication system constructed in the above-described manner, users of the computers 1 and 2 register their personal information into the management server 6 by accessing the management server 6 on the Internet 11 via the in-house LAN 12. Similarly, users of the computers 3 and 4 register their personal information by accessing the management server 6 via the public telephone network 14 and the ISP 13, and the user of the portable telephone device 5 registers his/her personal information by accessing the management server 6 via the wireless network 15.

When, thereafter, the user of the computer 1 wants to register the personal information of the user of the personal telephone device 5 into the address table on the computer 1, the user of the computer 1 sends the name or the like of the user of the portable telephone device 5, as a keyword for retrieval of personal information, to the management server 6 from the computer 1. In response, the management server 6 retrieves personal information (for example, personal information containing the keyword) which matches the keyword received from the computer 1, and sends the retrieved personal information to the computer 1. If the computer 1 receives the personal information sent from the management server 6, the computer 1 records the received personal information into the address table.

Thus, the user of the computer 1 can have the personal information of the user of the portable telephone device 5 recorded in the address table without having to input the personal information via the keyboard or the like.

Figure 3:
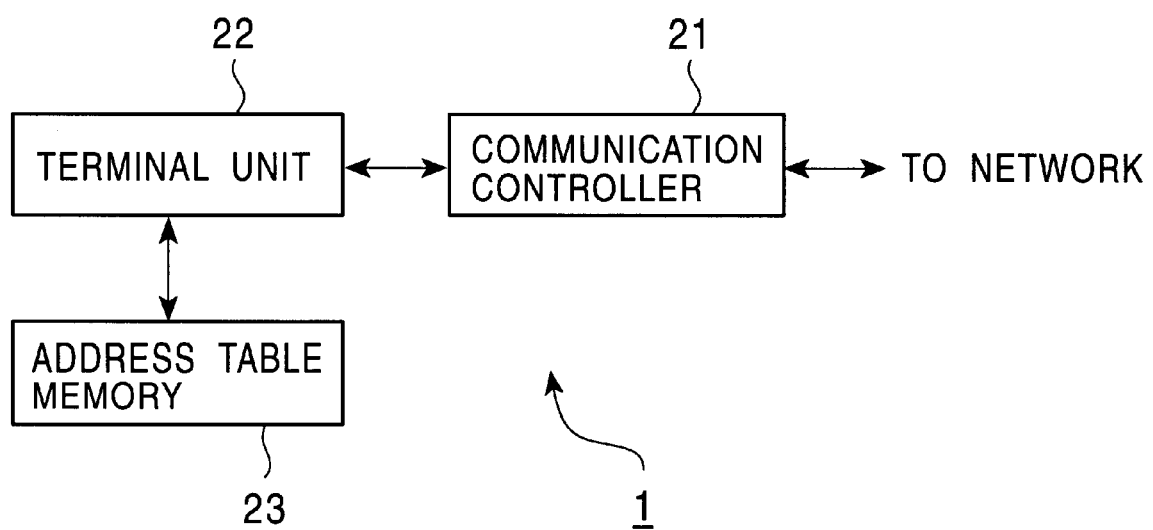
FIG. 3 is a block diagram illustrating an example of a functional configuration of a computer.

FIG. 3 illustrates an example of a functional configuration of the computer 1 shown in FIG. 2.

The computer 1 comprises a communication controller 21, a terminal unit 22, and an address table memory 23.

The communication controller 21 serves as an interface for communicating with the management server 6 on the Internet 11 via a network such as an in-house LAN 12, a public telephone network 14 and an ISP 13, or a wireless network 15. The terminal unit 22 serves to perform various processes required for the computer 1 to behave as a client of the management server 6. The address table memory 23 stores an address table in which personal information is recorded.

The computers 2–4 and the portable telephone device 5 shown in FIG. 2 are similar to the computer 1 shown in FIG. 3, and thus they are not described in further detail herein.

The computers 1–4 and the portable telephone device 5 (hereinafter, these devices are generically represented as client terminals) perform various processes including a personal information registration process for registering personal information into the management server 6 and a personal information acquisition process for acquiring personal information from the management server 6.

Figure 4:
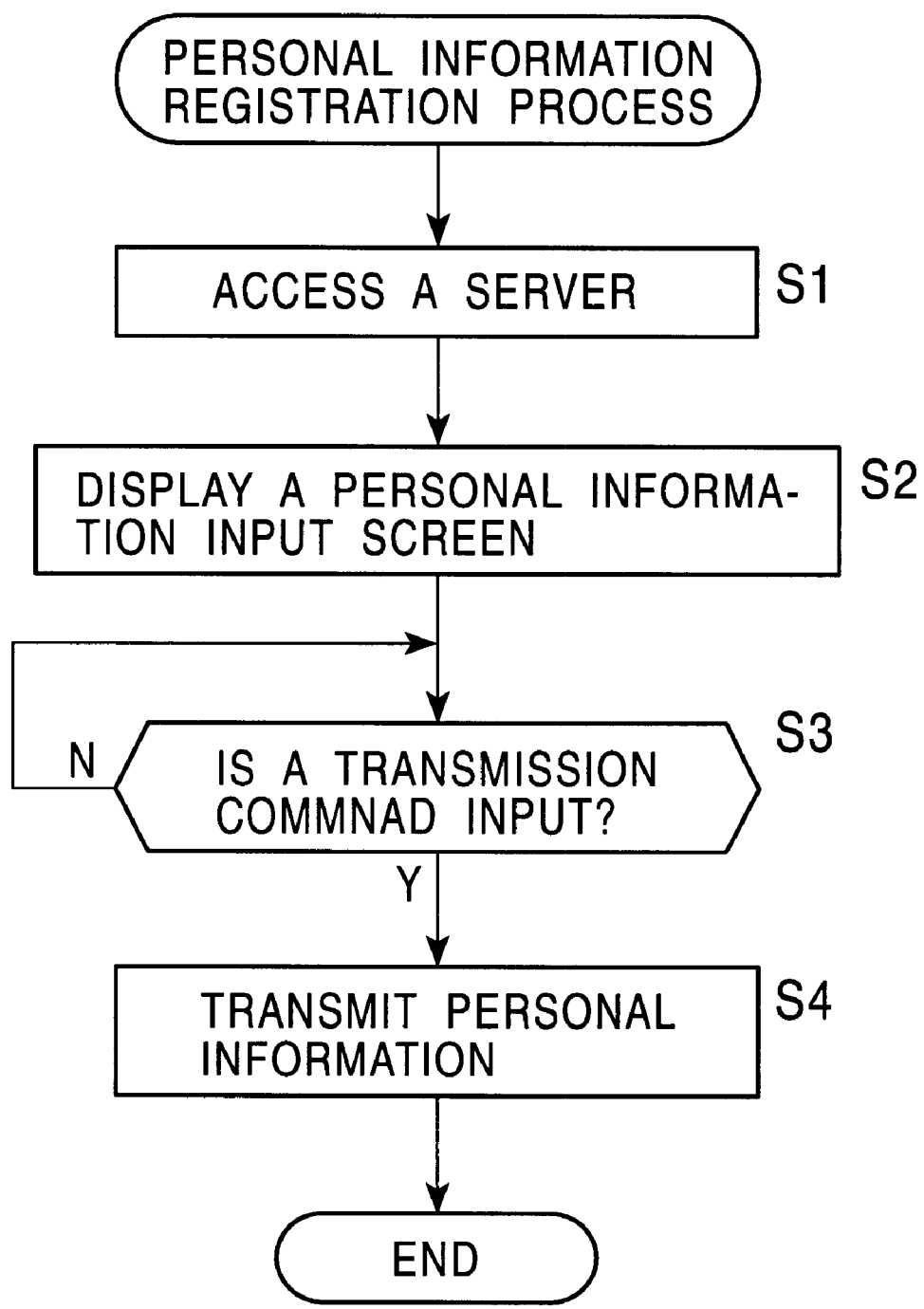
FIG. 4 is a flow chart illustrating a personal information registration process.

Referring to the flow chart shown in FIG. 4, the personal information registration process is described below.

When a user wants to register his/her personal information into the management server 6, the user operates a keyboard or the like (not shown) to input a registration command to the terminal unit 22. Thus, in step S1, the terminal unit 22 sends a personal information registration request to the management server 6 on the Internet 12 by accessing the management server 6 via the communication controller 21.

Upon reception of the request for registration of personal information, the management server 6 transmits to the client terminal an HTML (Hyper Text Markup Language) file or the like representing a personal information input screen used to input personal information, as described in further detail later. If the communication controller 21 of the client terminal receives the HTML file, the communication controller 21 transfers it to the terminal unit 22 In step S2, the terminal unit 22 displays the personal information input screen in accordance with the received HTML file.

The user inputs desired items of personal information via the personal information input screen. After completion of inputting the personal information, the user enters a personal information transmission command. In step S3, the terminal unit 22 determines whether a transmission command has been issued If it is determined in step S3 that the personal information transmission command has not been issued, the process returns to step S3.

If it is determined in step S3 that the personal information transmission command has been issued, the process goes to step S4. In step S4, the terminal unit 22 controls the communication controller 21 so as to transmit the personal information, which has been input via the personal information input screen, to the management server 6. Thus, the personal information registration process is completed.

Referring now to the flow chart shown in FIG. 5, the process of acquiring personal information is described below.

When a user wants to acquire personal information of another user from the management server 6, the user inputs a personal information request command to the terminal unit 22. In response, in step S11, the terminal unit 22 controls the communication controller 21 so as to transmit a personal information retrieval request command together with a keyword to the management server 6 on the Internet 11.

Herein, when the personal information request command is input to the terminal unit 22, the keyword may be given by the user by means of inputting the name or the electronic mail address of the user whose personal information is to be acquired.

The keyword may also be given from information locally owned by a client terminal. For example, when personal information of a certain user described in the address table stored in the address table memory 23 includes only the electronic mail address of that user, if another item of personal information of that user is required, the keyword may be obtained by invoking the address table and pointing to the electronic mail address. Alternatively, when an electronic mail from a certain user is displayed in a window on the display screen of the client terminal, if the user of the client terminal inputs a personal information request command, the terminal unit 22 detects the electronic mail address of the sender of the electronic mail displayed in the window and employs the detected electronic mail address as the keyword.

If the management server 6 receives the personal information retrieval request command together with the keyword from the client terminal, the management server 6 retrieves the personal information which matches the keyword as will be described in further detail later, and transmits (returns) the retrieved personal information to the client terminal. In step S12, the client terminal determines whether the personal information has been received from the management server 6. If it is determined in step S12 that the personal information has not been received from the management server 6, the process returns to step S12.

If it is determined in step S12 that the personal information has been received from the management server 6, that is, if the communication controller 21 has received the personal information from the management server 6, the process goes to step S13. In step S13, the terminal unit 22 receives the personal information from the communication controller 21 and registers it into the address table in the address table memory 23. Thus, the personal information acquisition process is completed.

As described above, the user of the client terminal can register personal information of a desired user into the address table by performing a simple operation upon the keyboard to generate a keyword without having to input a long keyword.

Figure 6:
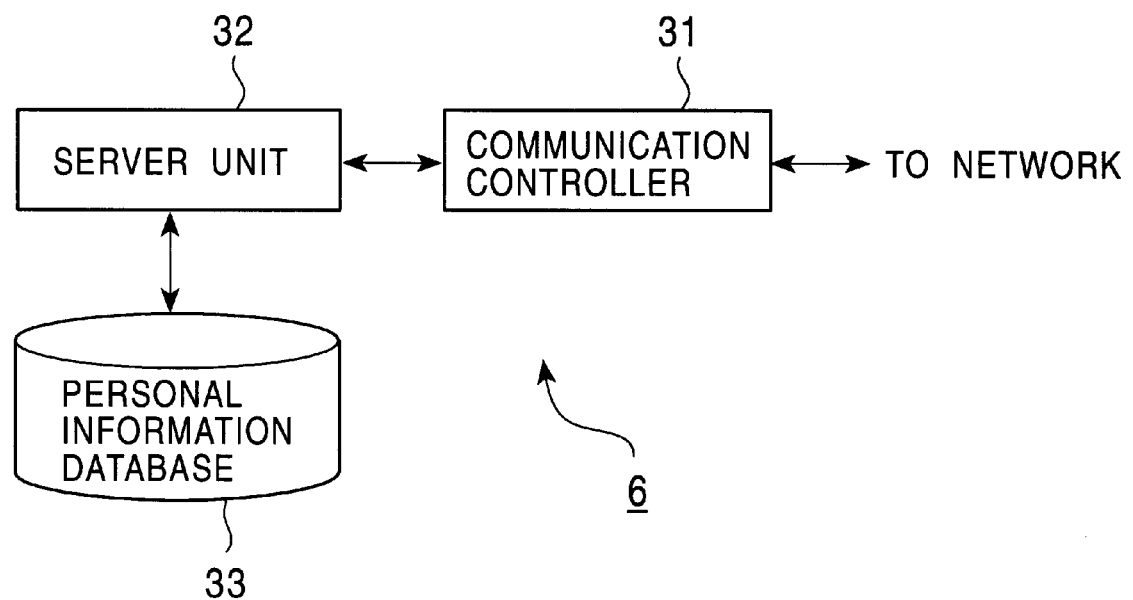
FIG. 6 is a block diagram illustrating an example of a functional configuration of a management server.

FIG. 6 illustrates an example of a functional configuration of the management serve 6 shown in FIG. 2.

The management server 6 includes a communication controller 31, a server unit 32, and a personal information database 33.

The communication controller 31 serves as an interface for communication via the Internet 11. The server unit 32 serves to perform various processes required for the management server 6 to behave as a server for providing services associated with personal information to computers 1 to 4 and the portable telephone device 5 The personal information database 33 retains personal information received, during the personal information registration process described above, from client terminals such as computers 1 to 4 and the portable telephone device 5.

The management server 6, constructed in the above-described manner, performs a database registration process in which personal information of a user of a client terminal is registered into the personal information database 33 and also performs a personal information providing process for providing personal information in response to a request from a client terminal.

Figure 7:
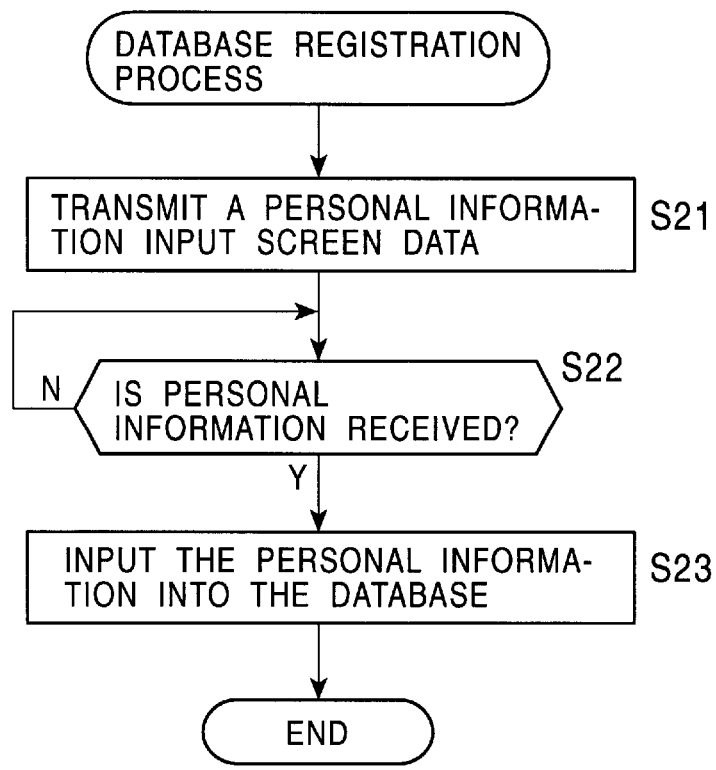
FIG. 7 is a flow chart illustrating a database registration process.

Referring to the flow chart shown in FIG. 7, the database registration process is described below.

The database registration process is started when the above-described personal information registration process (FIG. 4) is started at a client terminal and when the management server 6 receives a personal information registration request (hereinafter referred to as a registration request) from the client terminal.

That is, if the client terminal transmits the registration request command in the personal information registration process, the registration request command is received by the communication controller 31 and transferred to the server unit 32. Upon reception of the registration request, the server unit 32 starts the database registration process. In step S21, the server unit 32 controls the communication controller 31 so as to transmit an HTML file including data representing a personal information input screen to the client terminal which has issued the registration request. Thereafter, the process goes to step S22.

Upon reception of the HTML file including the data representing the personal information input screen, the user of the client terminal inputs his/her personal information via the personal information input screen and transmits the personal information to the management serve 6.

Thus, in step S22, the server unit 32 determines whether personal information has been received from the client terminal. If it is determined in step S32 that personal information has not been received, the process returns to step S22.

If it is determined in step S32 that personal information has been received, that is, if the communication controller 31 has received personal information from the client terminal, the process goes to step S23. In step S23, the personal information received from the client terminal is transferred from the communication controller 31 to the server unit 32. The server unit 32 supplies the personal information to the personal information database 33 so as to store the personal information therein. Thus, the database registration process is completed.

As described above, if a client terminal performs the personal information registration process, personal information is transmitted to the management server 6 and registered (stored) in the personal information database 33.

Figure 8:
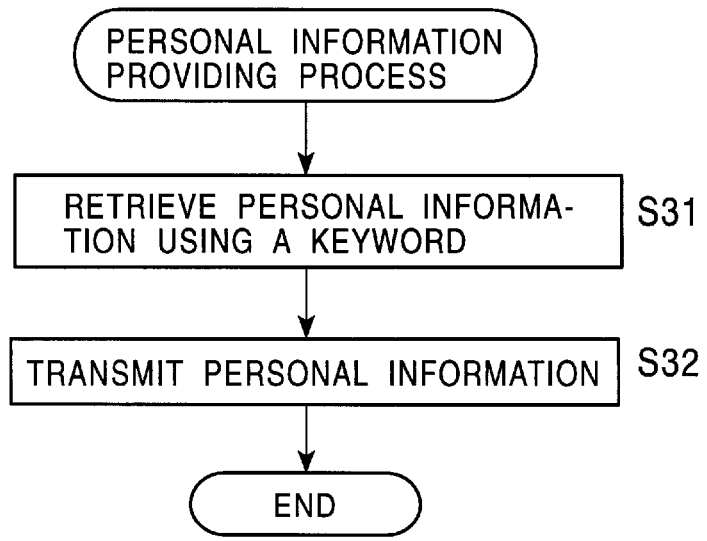
FIG. 8 is a flow chart illustrating a personal information providing process.

Referring now to the flow chart shown in FIG. 8, the personal information providing process is described.

When a client terminal starts the above-described personal information acquisition process (FIG. 5), if the management server 6 receives a personal information retrieval request command together with a keyword from the client terminal, the personal information providing process is started.

That is, if the client terminal transmits the retrieval request command and the keyword in the personal information acquisition process, they are received by the communication controller 31 and transferred to the server unit 32. Upon reception of the retrieval request command and the keyword, the server unit.32 starts the personal information providing process. In step S31, the server unit 32 retrieves personal information, which matches the keyword Which has been received together with the retrieval request command, from personal information registered in the personal information database 33. Then the process goes to step S32.

In step S32, the server unit 32 controls the communication controller 31 so as to transmit the personal information obtained in the retrieval process in step S31 to the client terminal which has issued the above retrieval request. Thus, the personal information providing process is completed.

As described above, if a client terminal performs the personal information acquisition process, personal information which matches a keyword transmitted to the management server 6 is provided to the client terminal.

There is a possibility that a change occurs in personal information, for example when a user moves. If a change occurs in personal information, the personal information is updated if the client terminal performs the personal information registration process (FIG. 4), and if, in response, the management server 6 performs the database registration process (FIG. 7). However, although the personal information database 33 in the management server 6 is updated, the updating is not reflected in address tables in other user's client terminals, in which the personal information has been written in the past after being acquired.

For example, in FIG. 2, after the user of the computer 1 has registered the personal information of the user of the computer 4 into the address table on the computer 1 by performing the personal information acquisition process, if a change occurs in the personal information of the user of the computer 4, the change in the personal information can be reflected in the personal information database 33 in the management server 6 by performing re-registration. However, old version of personal information of the user of the computer 4 remains in the address table on the computer 1 without being updated.

Thus, it is required to update the address table on the computer 1 by acquiring the updated personal information. However, in general, it is difficult for the user of the computer 1 to know whether or not the personal information of the user of the computer 4 has been updated. One way to avoid the above problem is to periodically perform the personal information acquisition process thereby updating the personal information registered in the address table. However, in this case, a user has to input a retrieval request command together with a keyword into the terminal unit 22 each time the personal information acquisition process is performed. This is troublesome for the user.

Instead, in the present invention, when personal information described in the personal information database 33 in the management server 6 is updated, address tables in client terminals can be updated in a more efficient fashion as described below.

Figure 9:
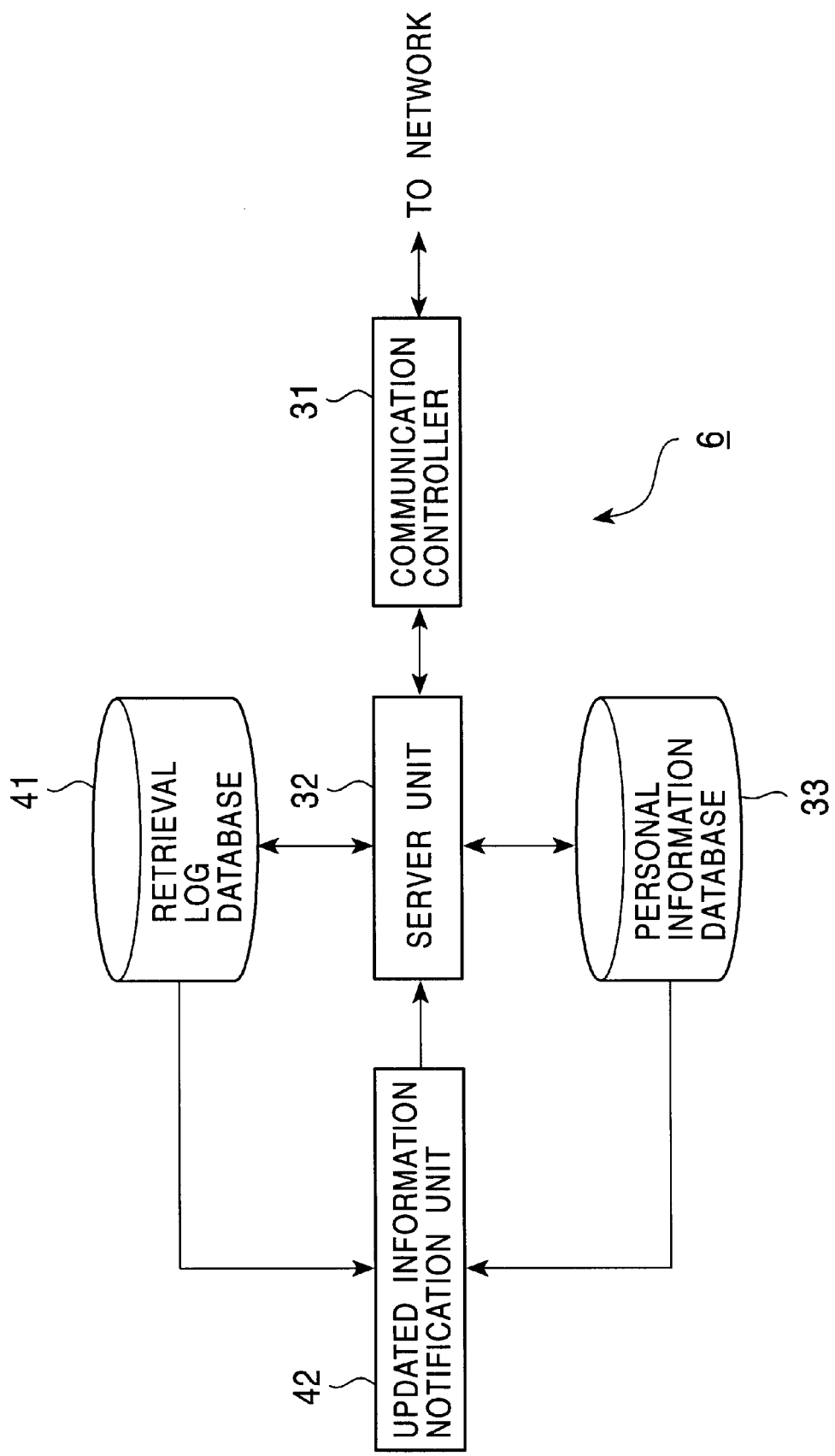
FIG. 9 is a block diagram illustrating another example of a functional configuration of a management server.

FIG. 9 illustrates another example of a functional configuration of the management server 6 shown in FIG. 2. In FIG. 9, similar parts to those in FIG. 6 are denoted by similar reference numerals and they are not described herein unless required. The management server 6 shown in FIG. 9 is basically similar to that shown in FIG. 6 except that it further includes a retrieval log database 41 and an update notification unit 42.

The retrieval log database 41 stores the history of personal information retrieval performed by the server unit 32 during the personal information providing process. More specifically, if the server unit 23 performs retrieval of personal information in response to a retrieval request issued by a client terminal, the server unit 23 describes a retrieval log so as to represent the date and time of the retrieval, information (user identification) which identifies the user whose personal information has been obtained in the retrieval, and the identification of the user of the client terminal who has issued the retrieval request in such a manner that the respective items are related to one another, and the server unit 23 stores the retrieval log into the retrieval log database 41.

User identification is issued by the management server 6 to a user when the personal information of that user is registered into the personal information database 33 for the first time in a database registration process performed by the management server 6 in response to a personal information registration process performed by the client terminal of that user. The management server 6 may also issue a password together with user identification. In this case, when the management server 6 receives a retrieval request from a client terminal, the management server 6 may request presentation of the user identification and the password of the user of that client terminal so as to authenticate the user The update notification unit 42 monitors the status of the personal information database 33. If personal information stored in the personal information database 33 is updated (changed), the update notification unit 42 checks the retrieval log stored in the retrieval log database 41 so as to detect (determine) client terminal users who have issued, in the past, retrieval requests for the personal information which has been updated at this time. If one or more client terminals are found which have requested, in the Past, the retrieval of the personal information of interest, the update notification unit 42 controls the server unit 32 so as to transmit the updated personal information to those client terminals.

As described above, in addition to the database registration process (FIG. 7) and the personal information providing process (FIG. 8), the management server 6 also has the capability of performing the update notification process for providing updated personal information to client terminals which have requested, in the past, retrieval of that personal information.

Figure 10:
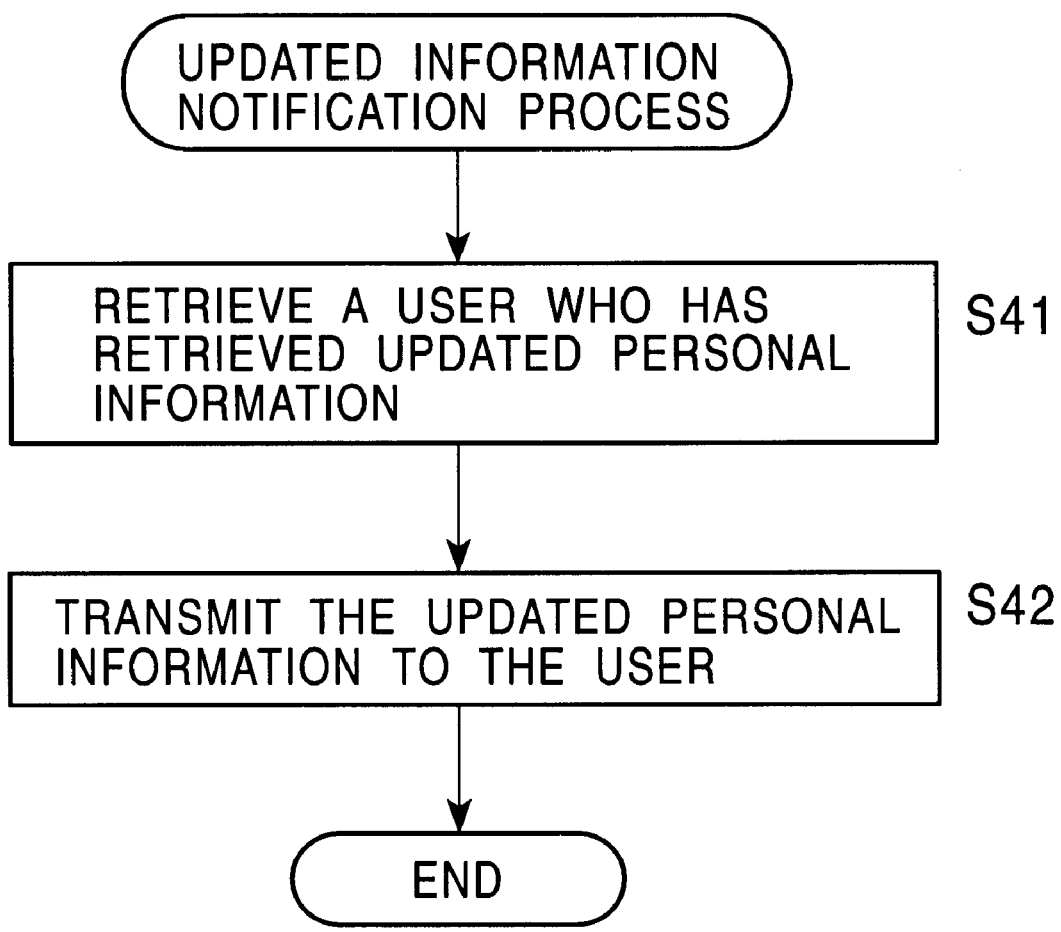
FIG. 10 is a flow chart illustrating an update notification process.

Referring to the flow chart shown in FIG. 10, the update notification process is described in further detail.

The update notification unit 42 monitors the status of the personal information database 33. If personal information stored in the personal information database 33 is updated, the update notification unit 42 starts the update notification process. In step S41, the update notification unit 42 checks the retrieval log stored in the retrieval log database 41 so as to detect client terminal users who have requested, in the past, retrieval of that personal information. More specifically, the update notification unit 42 searches the retrieval log database 41 for a retrieval log in which the user identification of the owner of the updated personal information is described as the user identification of the user whose personal information was retrieved (hereinafter referred to as retrieved-user identification). Furthermore, from the obtained retrieval log(s), the update notification unit 42 detects the user identification of client terminal user(s) described, in the retrieval log(s), as having issued the request for retrieval (hereinafter, the user identification of such a client terminal user will be referred to as retrieval requester identification). In step S42, the update notification unit 42 controls the server unit 32 so as to transmit the updated personal information to client terminal(s) corresponding to the detected retrieval requester identification. Thus, the update notification process is completed.

In response, the server unit 32 reads the updated personal information (the personal information of the user identified by the retrieved-user identification described in the retrieval log(s) obtained in step S41) from the personal information database 33. The server unit 32 then controls the communication controller 31 so as to transmit the updated personal information to the client terminal(s) corresponding to the retrieval requester identification.

Figure 5:
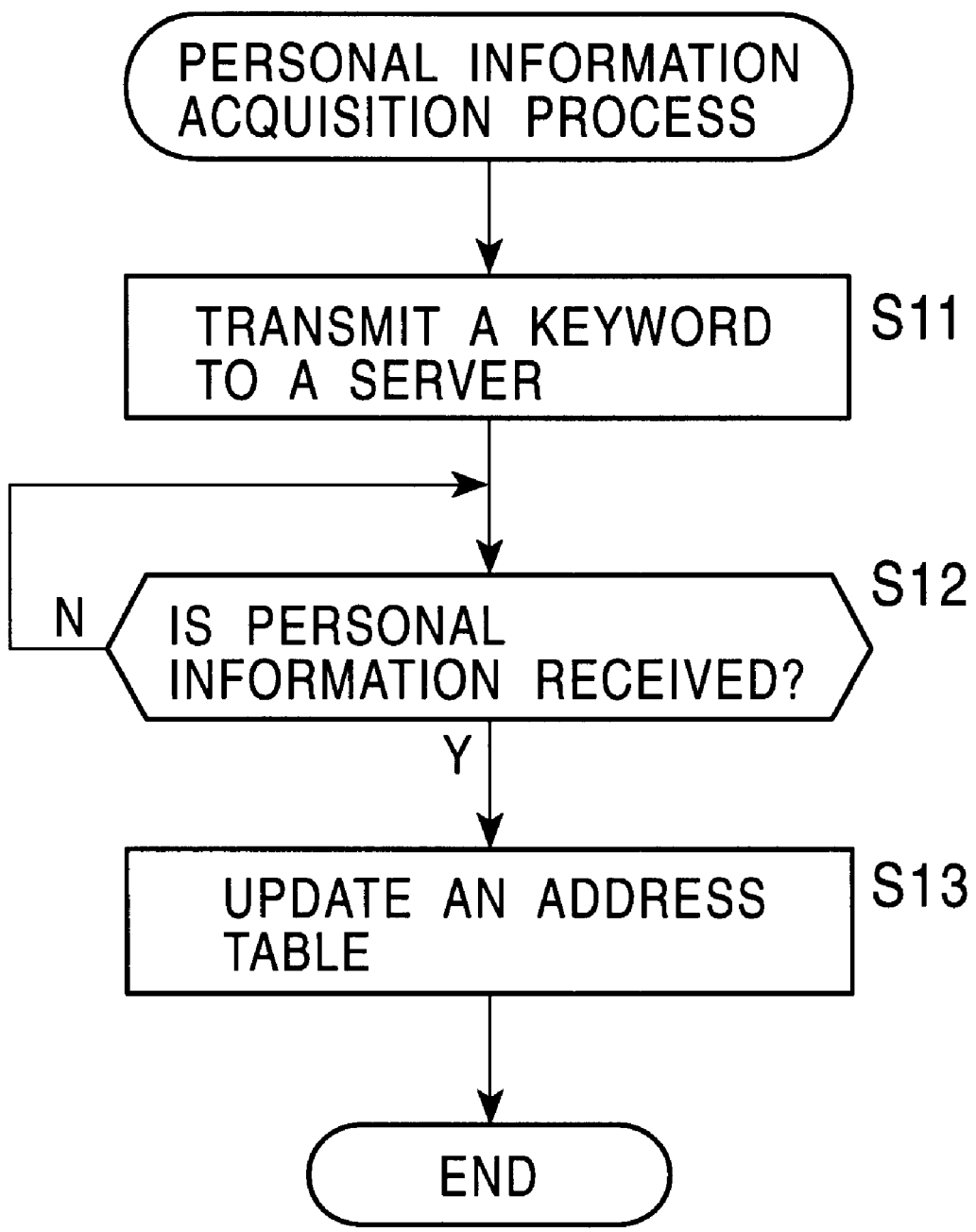
FIG. 5 is a flow chart illustrating a personal information acquisition process.

In the client terminal(s) corresponding to the retrieval-requester identification, a process is performed in a similar manner as in steps S12 and S13 of the personal information acquisition process (FIG. 5). That is, the updated version of personal information corresponding to personal information which has been acquired and registered, in the past, in the address table is received from the management server 6, and the old version of personal information in the address table is replaced with the updated version of personal information.

As described above, if personal information described in the personal information database 33 is updated, the management server 6 transmits the updated personal information to client terminals which have requested, in the past, retrieval of that personal information. Upon reception of the updated personal information, the client terminals replace the old version of personal information in the address table with the updated version of the personal information received. Thus, the address table of each client terminal is updated in an efficient fashion whenever a change occurs in personal information.

Figure 11:
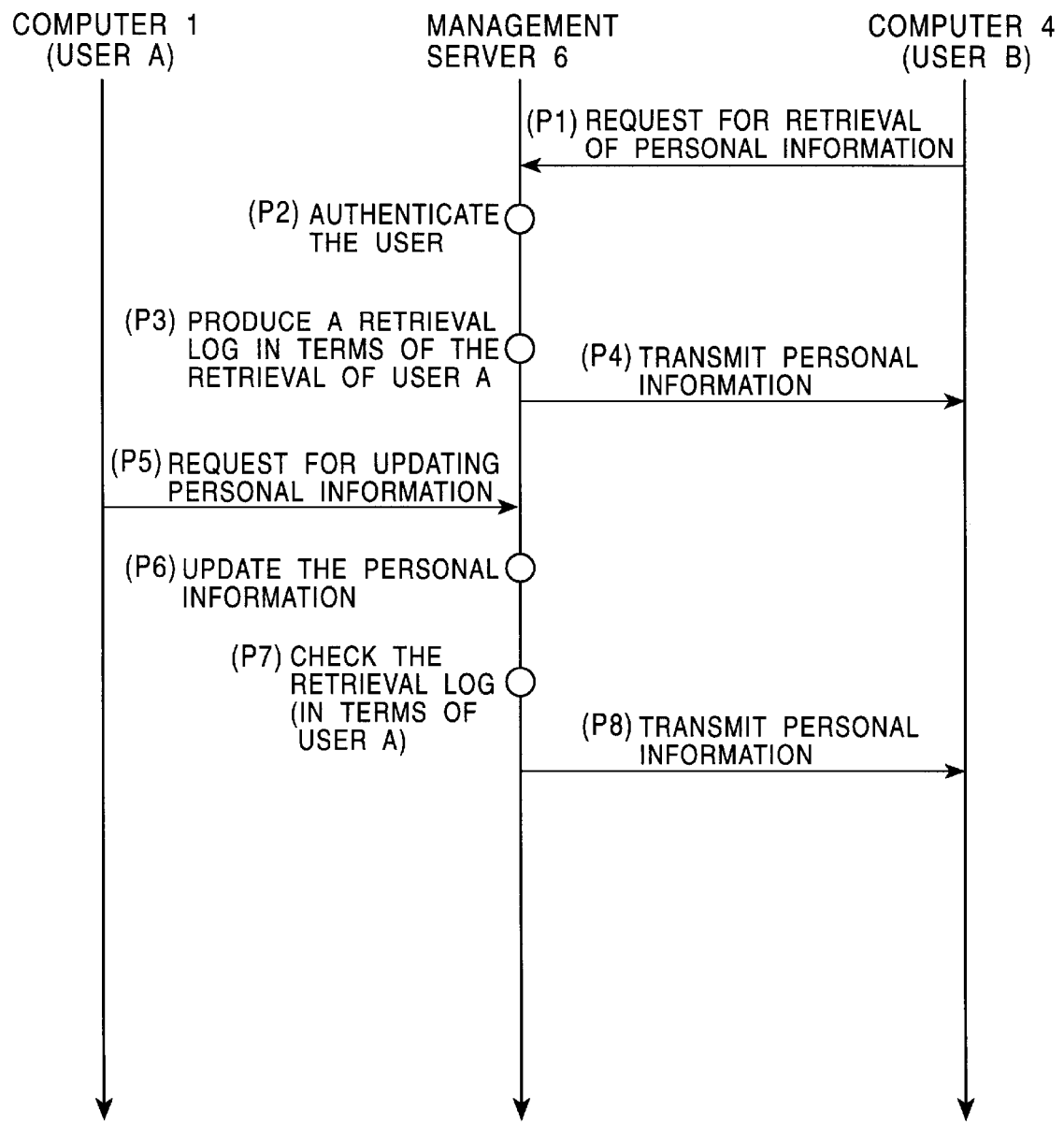
FIG. 11 is a schematic diagram illustrating a communication process between the management server and computers.

Herein, let the users of the computers 1 and 4 be denoted by user A and user B, respectively, and we assume that the personal information of user A and that of user B are registered in the personal information database 33 stored in the management server 6. If user B of the computer 4 requests the management server 6 to retrieve the personal information of user A (P1 in FIG. 11), the management server 6 authenticates user B (P2) and retrieves the personal information of user A in response to the retrieval request. The management server 6 then produces a retrieval log describing that user B has issued a request for retrieval of the personal information of user A (P3). The personal information of user A is transmitted to the computer 4 of user B who has issued the retrieval request. Thus, the personal information of user A is recorded in the address table in the computer 4 (P4).

If, thereafter, a change occurs in the personal information of user A, the computer 1 of user A transmits an update request to the management server 6 to update the personal information of user A (P5). In accordance with the received update request, the management server 6 updates the personal information of user A described in the personal information database 33 (P6).

The management server 6 then detects, from the retrieval log, that user B has issued a request in the past for retrieval of the personal information of user A (P7), and the management server 6 transmits the updated personal information of user A to the computer 4 of user B (P8). Upon reception of the updated personal information, the computer of user B replaces the old version of personal information of user A with the updated version.

Thus, user B can obtain the newest personal information of user A, even if user B does not know that the personal information of user A has been updated, or even if the personal information acquisition process is not performed periodically.

In this specific example, the management server 6 transmits updated personal information to a client terminal. Alternatively, the management server 6 may transmit a message to notify a client terminal that personal information has been updated.

When the management server 6 transmits updated personal information to a client terminal, it is required that the client terminal be connected to the Internet 11. If the client terminal is not connected to the Internet 11, it is impossible to transmit the updated personal information to the client terminal. To avoid the above problem, when the client terminal is not connected to the Internet 11, the management server 6 may spool the updated personal information, and the management server 6 may transmit the spooled personal information to the client terminal when the client terminal is connected to the Internet 11. Alternatively, the management server 6 may transmit updated personal information in the form of an electronic mail.

In the embodiment described above, the management server 6 describes retrieval logs thereby allowing the address tables of client terminals to be updated in the efficient manner. Alternatively, a client terminal such as a computer 1 may describe a retrieval log thereby allowing the address table to be updated in an efficient fashion.

Figure 12:
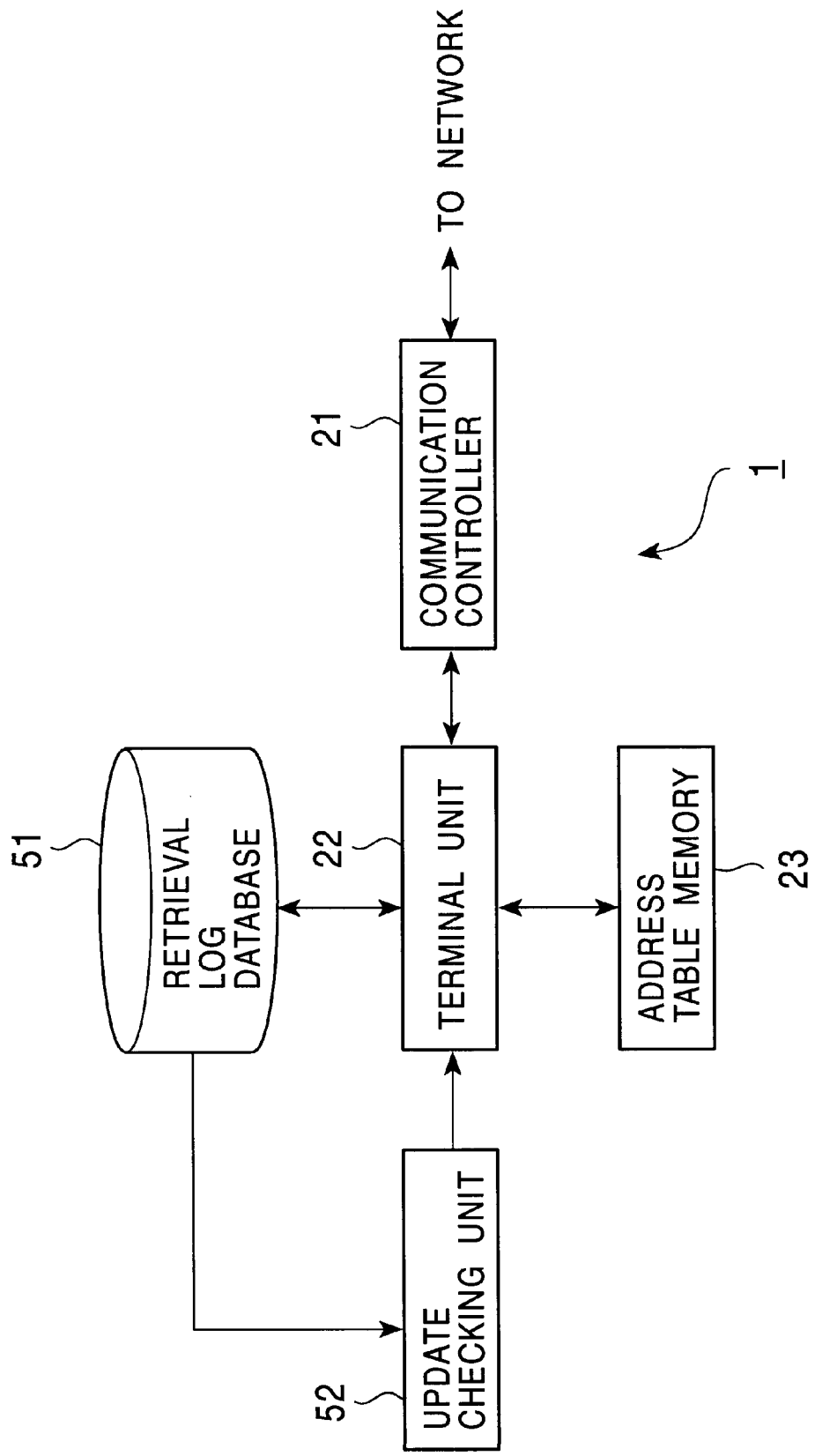
FIG. 12 is a block diagram illustrating another example of a functional configuration of a computer.

FIG. 12 illustrates an example of a manner of configuring the computer 1 shown in FIG. 2 so that retrieval logs associated with personal information retrieval requests issued to the management server 6 are produced by the computer 1 and stored therein. In FIG. 12, similar parts to those in FIG. 3 are denoted by similar reference numerals, and they are not described in further detail unless required. The computer 1 shown in FIG. 12 is basically similar to that shown in FIG. 3 except that it further includes a retrieval log database 51 and an update checking unit 52.

In the retrieval log database 51, the history of personal information retrieval requests issued by the terminal unit 22 during the above-described personal information acquisition process is described (in the form of a retrieval log). More specifically, when the terminal unit 22 has issued a retrieval request to the management server 6, the terminal unit 22 describes, in a retrieval log, the date and time of the retrieval request and the user identification (retrieved-user identification) of a user whose personal information has been obtained in the retrieval in such a manner that these items are related to each other, and the terminal unit 22 stores the retrieval log in the retrieval log database 51.

The update checking unit 52 checks the retrieval logs stored in the retrieval log database 51 at regular or irregular intervals so as to detect user identification (retrieved-user identification) of personal information which has been retrieved in the past by issuing a retrieval request. Furthermore, the update checking unit 52 controls the terminal unit 22 so as to request the management server 6 to check whether or not the personal information corresponding to the detected user identification has been updated.

Thus, in addition to the personal information registration process (FIG. 4) and the personal information acquisition process (FIG. 5), the computer 1 configured in the above-described manner also has the capability of performing the update checking process to request the management server 6 to check whether or not personal information has been updated after being acquired in the past by issuing a retrieval request.

Figure 13:
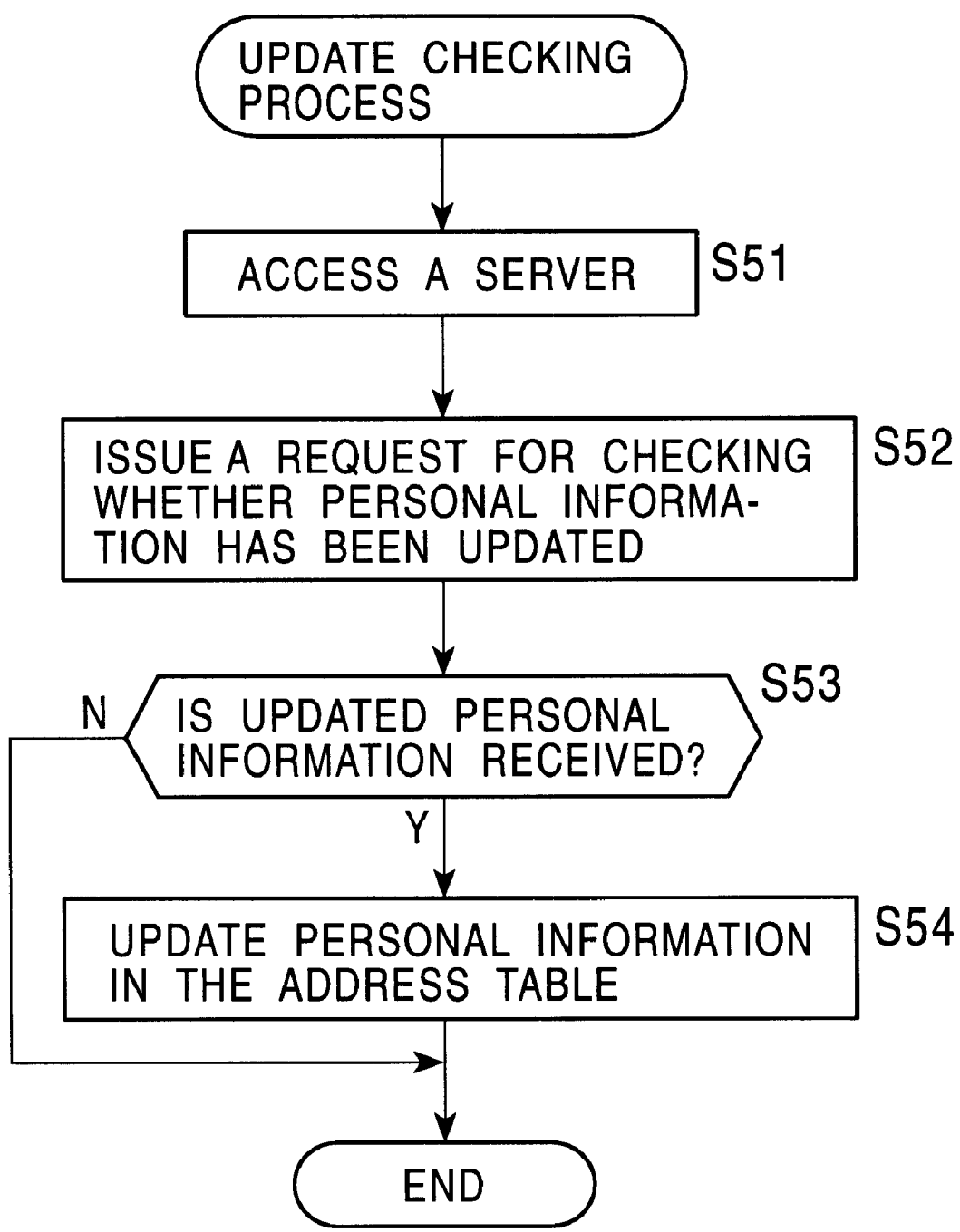
FIG. 13 is a flow chart illustrating an update checking process.

Referring to the flow chart shown in FIG. 13, the update checking process is described in detail.

The update checking unit 52 checks the retrieval logs stored in the retrieval log database 51 at regular or irregular intervals so as to detect user identification (retrieved user identification) of personal information which has been retrieved in the past by issuing a retrieval request. The update checking unit 52 then controls the terminal unit 22 so as to request the management server 6 to check whether or not the personal information of the user corresponding to the detected retrieved-user identification has been updated. As a result, the update checking process is started.

First, in step S51, in the update checking process, the terminal unit 22 controls the communication controller 21 so as to access the management server 6 on the Internet 11. Thereafter, in step S52, the terminal unit 22 transmits, via the communication controller 21, a request to the management server 6 to check whether the personal information of the user corresponding to the retrieved-user identification detected by the update checking unit 52 has been updated.

In response to the request, the management server 6 checks the personal information database 33 to determine whether the personal information of the user corresponding to the retrieved-user identification has been updated. If the personal information of the user corresponding to the retrieved-user identification has been updated, the management server 6 transmits the updated personal information to the client terminal (the computer 1, in this specific example) which has issued the request for checking. In step S53, the computer 1 determines whether the updated personal information has been received from the management server 6.

If it is determined in step S53 that the updated personal information has been received from the management server 6, that is, if the communication controller 21 has received the updated personal information from the management server 6, the process goes to step S54. In step S54, the communication controller 21 transfers the updated personal information to the terminal unit 22. The terminal unit 22 replaces the old version of personal information described in the address table stored in the address table memory 23 with the updated version of personal information. Thus, the update checking process is completed.

However, if it is determined in step S53 that the updated personal information is not received from the management server 6, that is, if the personal information of the user corresponding to the retrieved-user identification has not been updated and thus the management server 6 does not transmit updated personal information, step S54 is skipped and the-update checking process is terminated.

As described above, the update checking process performed by the client terminal at regular or irregular intervals also allows the address table to be updated in an efficient fashion.

Figure 14:
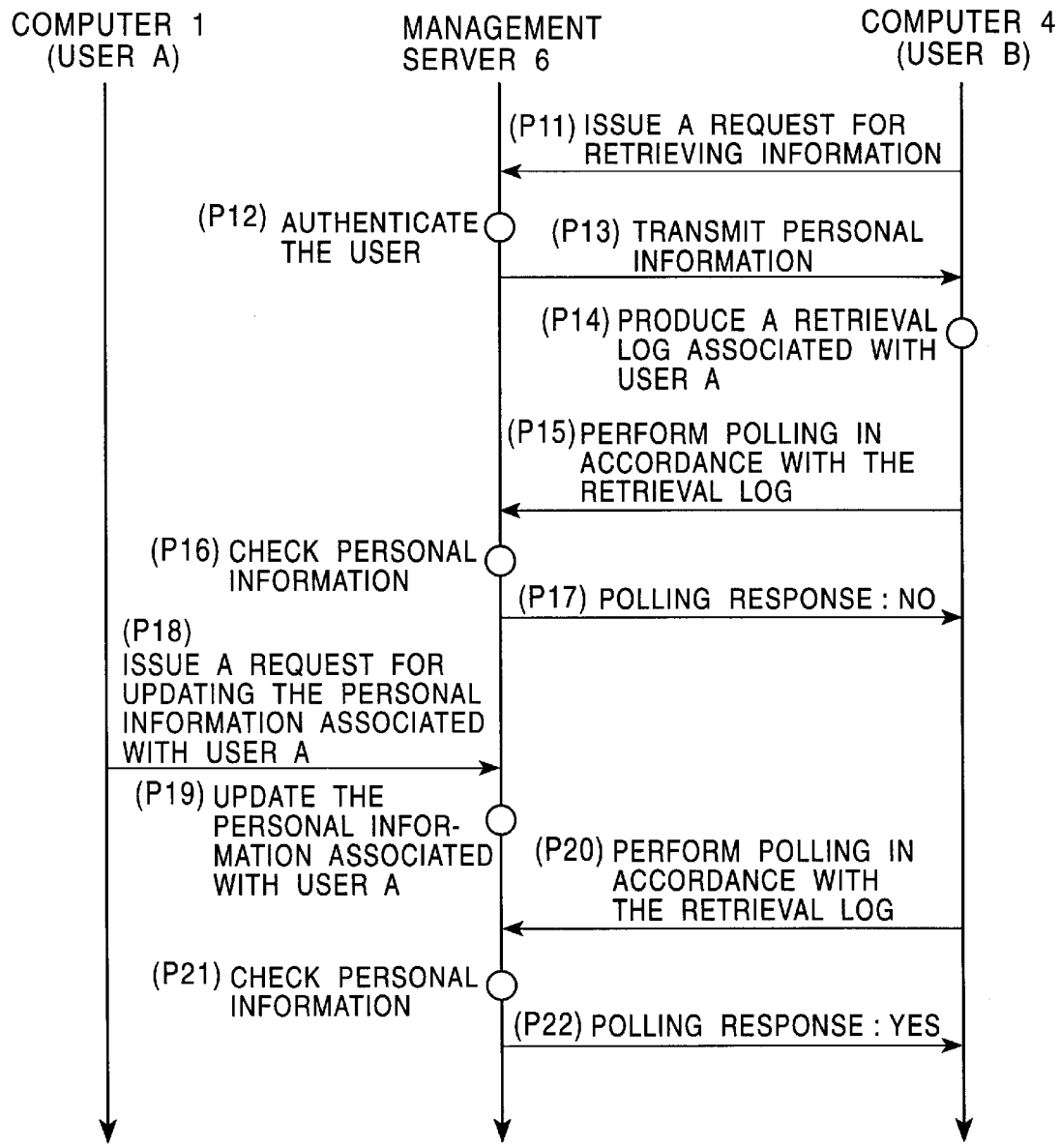
FIG. 14 is a schematic diagram illustrating a communication process between the management server and computers.

Herein, let the users of the computers 1 and 4 be denoted by user A and user B, respectively, and we assume that the personal information of user A and that of user B are registered in the personal information database 33 stored in the management server 6. If user B of the computer 4 requests the management server 6 to retrieve the personal information of user A (P11 in FIG. 14), the management server 6 authenticates user B (P12) as in the process described above with reference FIG. 11, and retrieves the personal information of user A in response to the retrieval request. The management server 6 transmits the personal information of user A to the computer 4 of user B who has issued the retrieval request.

If the computer 4 receives the personal information sent from the management server 6, the computer 4 records the received personal information into the address table (P13). The computer 4 then describes, in a retrieval log, that the computer 4 has issued the request for retrieval of the personal information of user A (P14). The retrieval log is stored in the retrieval log database 51.

Thereafter, in accordance with the retrieval log describing that a request for retrieval of the personal information of user A has been issued, the computer 4 transmits, at predetermined times, a request command to the management server 6 to check whether the personal information of user A has been updated (P15) (that is, polling is performed in accordance with the retrieval log).

Upon reception of the request for checking, the management server 6 checks whether the personal information of user A recorded in the personal information database 33 has been updated (P16). In this specific example, the personal information of user A has not been updated, and thus the management server 6 returns a message to the computer 4 to tell that the personal information is not updated (P17) (polling response: NO).

If personal information recorded in the personal information database 33 is updated, the management server 6 describes and retains the history of updating. Thus, it is possible to determine whether or not personal information of any user has been updated, by checking the history of updating.

If a change occurs in the personal information of user A, the computer 1 of user A transmits an update request to the management server 6 to update the personal information of user A (P18). In accordance with the received update request, the management server 6 updates the personal information of user A described in the personal information database 33 (P19).

If in accordance with the retrieval log describing that a request for retrieval of the personal information of user A has been issued, the computer 4 transmits, at a next scheduled time after the updating of the personal information of user A, a request command to the management server 6 to check whether the personal information of user A has been updated (P20), the management server 6 checks whether the personal information of user A recorded in the personal information database 33 has been updated (P21). In this case, the personal information of use A has been updated, and thus the management server 6 transmits the updated personal information of user A together with a message telling that the personal information has been updated to the computer 4 (P22) (polling response: YES). The computer 4 of user B replaces the old version of personal information of user A recorded in the address table with the updated version received.

Thus, user B can obtain the newest personal information of user A, even if user B does not know that the personal information of user A has been updated, or even if the personal information acquisition process is not performed periodically.

Because personal information managed by the management server 6 is private information of each user, it is desirable to perform authentication not only when a client terminal issues a retrieval request to the management server 6, but also when a client terminal requests the management server 6 to update personal information or when the management server 6 transmits updated personal information to a client terminal, thereby assuring security.

In the specific example of the personal information providing process (FIG. 8) described above, the management server 6 provides personal information without imposing any restriction. However, in general, owners of personal information want to provide their personal information to only particular users such as a friend or an acquaintance, and want to restrict the providing of personal information to other users such as sales persons or the like.

In some cases, owners of personal information want to allow all items of personal information to be provided to particular users but want to restrict the providing of personal information to certain users to only particular items of the personal information.

In view of the above, the management server 6 has the capability of restricting the access to personal information of other users. That is, the management server 6 has access restriction information (access permission/restriction information) serving as profile data representing whether access to personal information is restricted (or permitted). The management server 6 controls the access of a user to personal information of another user in accordance with the access restriction information.

For each personal information, the access restriction information may specify particular users who are not allowed to the access personal information. Alternatively, for each user, the access restriction information may specify personal information which is not permitted to be accessed by the user.

Figure 15:
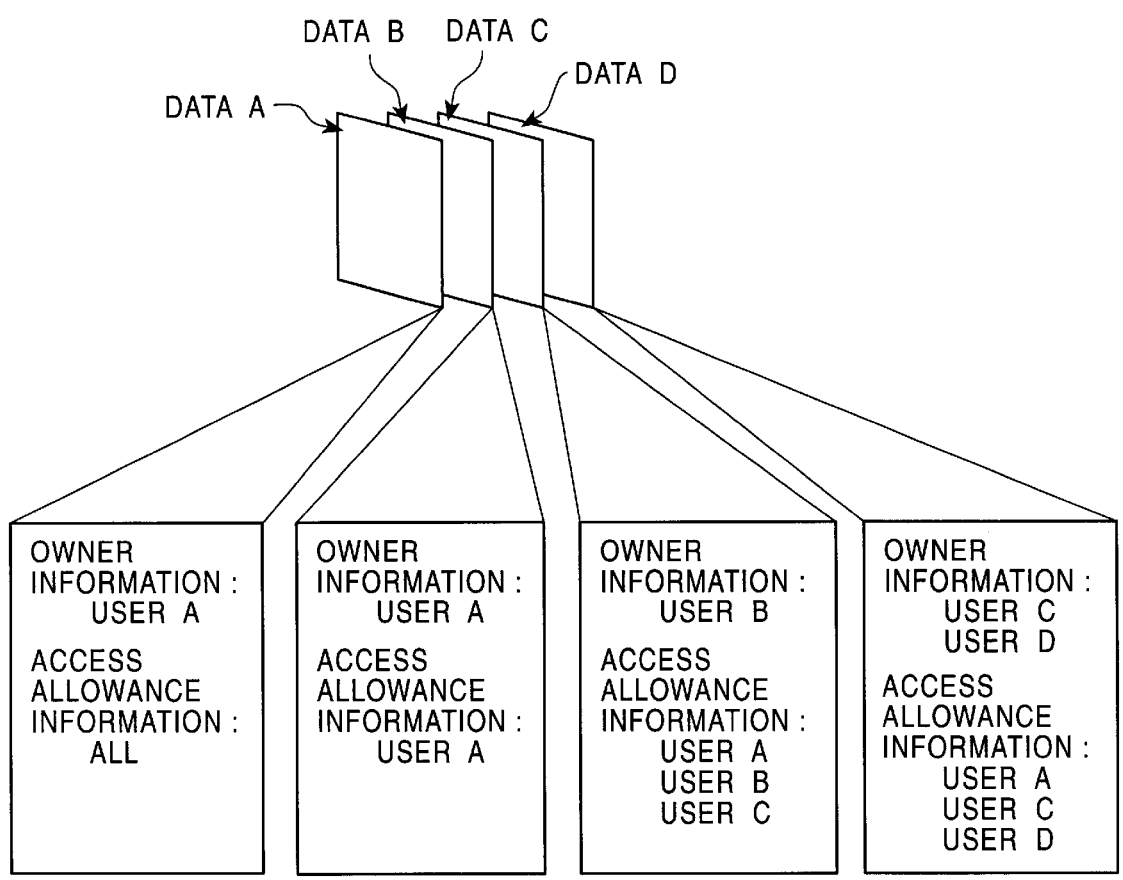
FIG. 15 is a schematic diagram illustrating access restriction information.

FIG. 15 illustrates an example of access restriction information in which users are specified who are not permitted to access each personal information.

In FIG. 15, the access restriction information includes owner information representing owners of personal information and access permission information representing users who are permitted to access personal information (who can acquire personal information). In the specific example shown in FIG. 15, the access restriction information includes data A, data B, data C, and data D each representing personal information. The owner information represents that the owner of data A is user A, the owner of data B is user A, the owner of data C is user B, and the owners of data D are user C and user D. The access permission information represents that access to data A is allowed for all users, access to data. B is allowed for only user A, access to data C is allowed for user A, user B, and user C, and access to data D s allowed for user A, user C, and user D.

Figure 16:
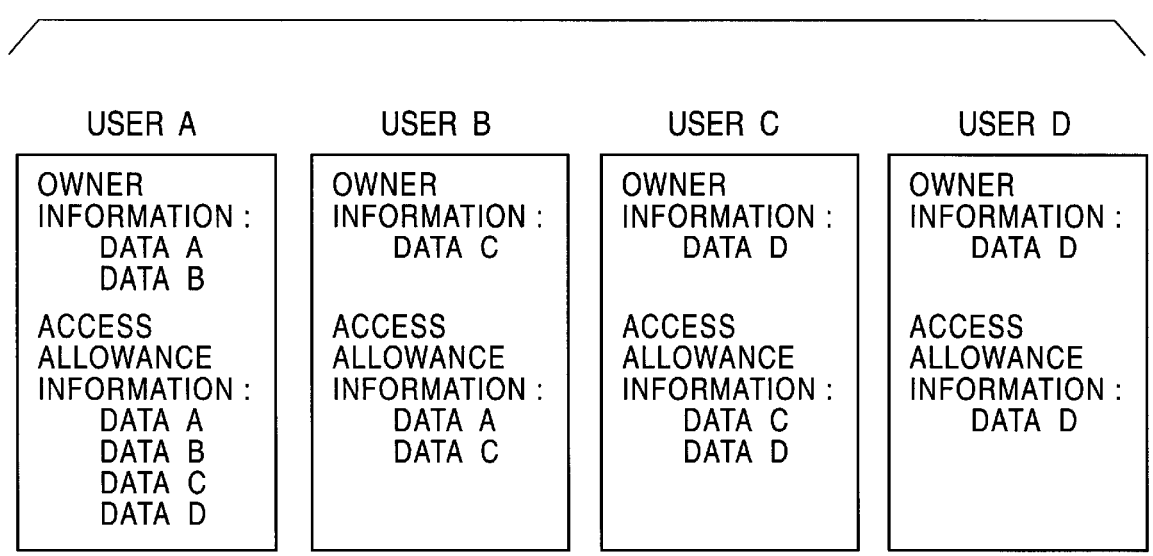
FIG. 16 is a schematic diagram illustrating access restriction information.

In an example shown in FIG. 16, the access restriction information describes access restriction for each user.

In FIG. 16, the access restriction information consists of owned-data information and access permission information wherein the owned-data information represents personal information data owned by each user and the access permission information represents data which is allowed to be access by each user (data the user can receive). In the specific example shown in FIG. 16, the access restriction information is described for user A, user B, user C, and user D. The owned-data information represents that user A owns data A and data B; user B owns data C; user C owns data D; and user D owns data D. The access permission information represents that user A is permitted to access data A, data B, data C, and data D; user B is permitted to access data A and data C; user C is permitted to access data C and data D; and user D is permitted to access data D.

In the examples shown in FIGS. 15 and 16, users who are permitted to access personal information are described in the access restriction information. Alternatively, users who are not permitted to access personal information maybe described in the access restriction information.

Figure 17:
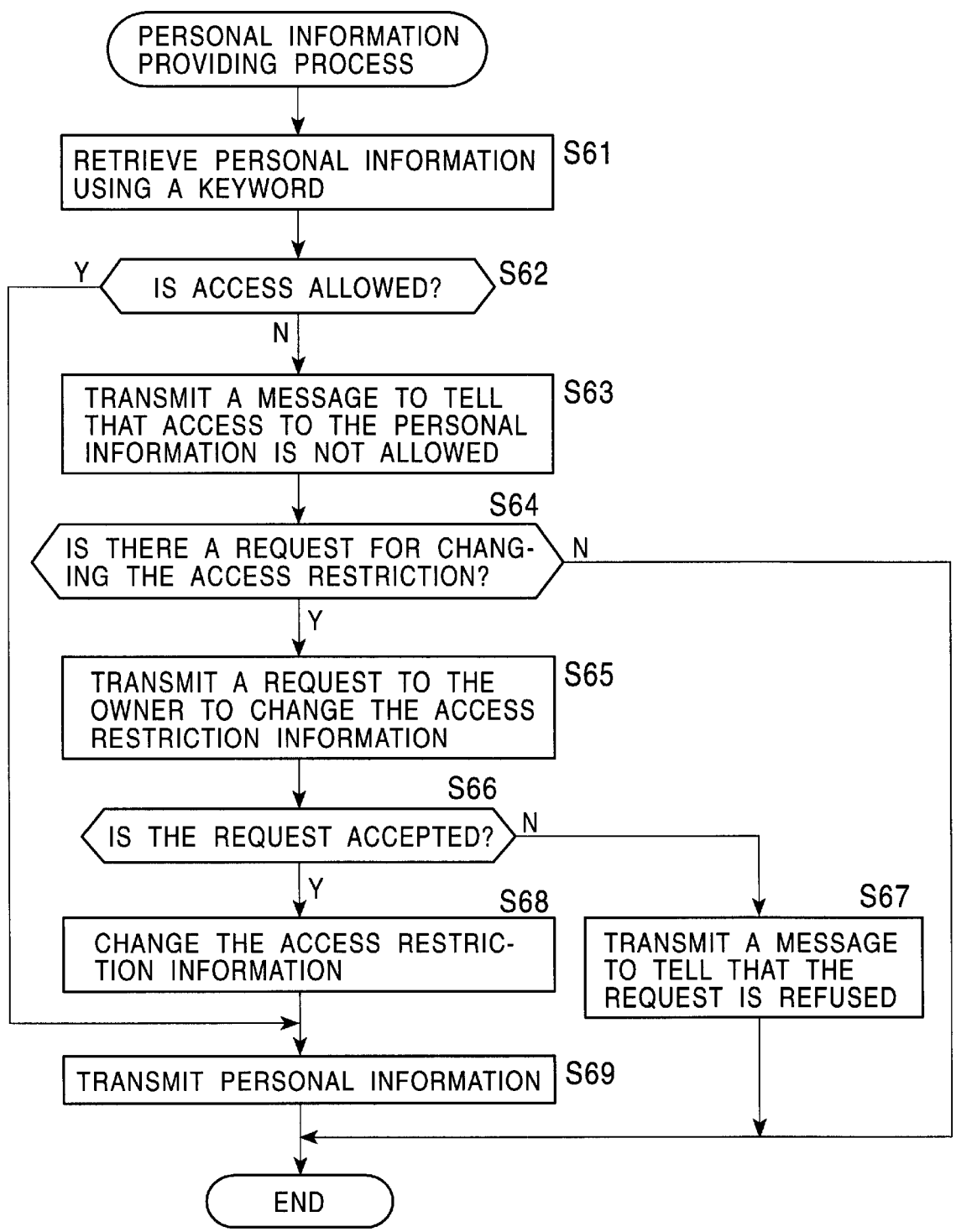
FIG. 17 is a flow chart illustrating a personal information providing process.

Instead of specifying users who are permitted to access personal information, users may be grouped, and access allowance may be described for each group The flowchart shown in FIG. 17 illustrates a personal information providing process performed by the management server 6 shown in FIG. 6 or 9, wherein access to personal information is restricted in accordance with the access restriction information.

As described earlier, the personal information providing process is started when a client terminal starts the personal information acquisition process (FIG. 5) and thus the management server 6 receives a personal information retrieval request together with a keyword from the client terminal.

That is, if the client terminal transmits the retrieval request command and the keyword in the personal information acquisition process, they are received by the communication controller 31 and transferred to the server unit 32. Upon reception of the retrieval request command and the keyword, the server unit 32 starts the personal information providing process. In step S61, the server unit 32 retrieves personal information, which matches the keyword which has been received together with the retrieval request command, from personal information recorded in the personal information database 33. Then the process goes to step S62.

In step S62, the server unit 32 determines, in accordance with the access restriction information, whether the user of the client terminal which has issued the retrieval request is permitted to access the personal information retrieved in step S61

In the present embodiment, the access restriction information associated with the personal information recorded in the personal information database 33 is described in the personal information itself. Therefore, the server unit 32 checks the access restriction information included in the personal information retrieved in step S61, and the server unit 32 determines, in accordance with access restriction information, whether the access to that personal information is permitted or not.

The initial contents of access restriction information included in the personal information are described, for example, when the owner of the personal information registers his/her personal information into the management server 6. The initial contents of the access restriction information may be described such that no other users are permitted to access the personal information or such that only a particular user is permitted to access the personal information.

If it is determined in step S62 that the user of the client terminal which has issued the retrieval request is permitted to access the personal information retrieved in step S61, that is, if the access restriction information is set such that the user of the client terminal which has issued the retrieval request is permitted to access the personal information retrieved in step S61, the process goes to step S69 without performing steps S63–S68. In step S69, the server unit 32 controls the communication controller 31 so as to transmit the personal information obtained in the retrieval process to the client terminal which has issued the above retrieval request. Thus, the personal information providing process is completed.

In this case, when the client terminal receives the personal information corresponding to the keyword transmitted together with the retrieval request command, the client terminal records the received personal information into the address table.

On the other hand, if it is determined in step S62 that the user of the client terminal which has issued the retrieval request is not permitted to access the personal information retrieved in step S61, that is, if the access restriction information is set such that the user of the client terminal which has issued the retrieval request is not permitted to access the personal information retrieved in step S61, the process goes to step S63. In step S63, the server unit 32 controls the communication controller 31 so as to transmit a message (refusal message) to the client terminal which has issued the retrieval request to tell that access to the requested personal information is not allowed. Thereafter, the process goes to step S64.

When the client terminal receives the refusal message from the management server 6, the refusal message is displayed When the user reads the refusal message, if the user still wants to access the retrieved personal information, the user transmits a message (restriction removal request message) to the management server 6 by operating the client terminal, to request the management server 6 to change the access restriction information so that the user is allowed to access the personal information.

In step S64, the management server 6 determines whether the restriction removal request message has been received from the client terminal. If it is determined in step S64 that the restriction removal request message is not received from the client terminal, that is, if the communication controller 31 receives no restriction removal request message, steps S65–S69 are skipped and the personal information providing process is terminated.

In this case, the client terminal cannot acquire the personal information corresponding to the keyword transmitted together with the retrieval request command On the other hand, if it is determined in step S64 that the restriction removal request message has bee received from the client terminal, that is, if the communication controller 31 receives the restriction removal request message, the process goes to step S65. In step S65, the server unit 32 controls the communication controller 31 so as to transmit a message (restriction removal inquiry message) to the client terminal of the user who is the owner of the retrieved personal information, to inquire whether to permit the access restriction information to be changed in response to the restriction removal request such that the requester is permitted to access the personal information. Then the process goes to step S66. Herein, the restriction removal inquiry message includes information as to the user who has issued the access restriction removal request (for example, the user identification and the name of the requester).

The restriction removal inquiry message transmitted from the management server 6 is received by the client terminal of the owner of the personal information and displayed. When the owner of the personal information reads the restriction removal inquiry message, if he/she decides to give permission, as to access to the personal information, to the user who has issued the access restriction removal request, he/she transmits a message (restriction removal approval message)from his/her client terminal to the management server 6 to tell that he/she approves the removal of access restriction.

In step S66, the management server 6 determines whether the restriction removal approval message has been received from the client terminal of the owner of the personal information. If it is determined in S66 that the restriction removal approval message is not received from the client terminal of the owner of the personal information, the process goes to step S67. In step S67, the server unit 32 controls the communication controller 31 so as to transmit a message to the client terminal which has transmitted the retrieval request to tell that access to the personal information retrieved in step S61 is refused (this message is also referred to as the refusal message). Then the personal information providing process is terminated.

Thus, also in this case, the client terminal cannot acquire the personal information corresponding to the keyword transmitted together with the retrieval request command.

On the other hand, if it is determined in S66 that the restriction removal approval message has been received from the client terminal of the owner of the personal information, the process goes to step S68. In step S68, the server unit 32 changes the access restriction information included in the personal information of interest described in the personal information database 33 such that the user of the client terminal which has transmitted the retrieval request is permitted to access the personal information of interest. Then the process goes to step S69.

In step S69, the personal information retrieved in step S61 is transmitted to the client terminal which has issued the retrieval request. Thus, the personal information providing process is completed.

In this case, when the client terminal receives the personal information corresponding to the keyword transmitted together with the retrieval request command, the client terminal records the received personal information into the address table.

As described above, when the management server 6 receives a request from a certain user for example user A for retrieval of personal information of another user for example user B, if user A is not permitted to access the personal information of user B, the management server 6 transmits a restriction removal inquiry message to user B to inquiry whether user B approves the removal of access restriction to user A. Only when a restriction removal approval message has been received from user B, the management server 6 provides the personal information of user B to user A who has issued the retrieval request. This allows user B to easily control the access of other users to the personal information of user B.

User B may initially set the access restriction information such that access to the personal information of user B is not permitted for any other user, and user B may give permission, as to access to his/her personal information, to only particular users simply by responding to a restriction removal inquiry message.

Furthermore, in the present embodiment, when user B returns a restriction removal approval message in response to a restriction removal inquiry message, the access restriction information is changed such that user A, who has issued a request for retrieval of personal information of user B, is permitted to access to that personal information, thereby allowing user B to give access permission to only particular users without having to set the access restriction information for each user.

That is, when user A issues a retrieval request, if the access restriction information is changed, then user A can access the personal information of user B at any time thereafter without needing further permission In conventional techniques, users themselves make initial settings and modifications of access restriction information associated with their personal information. Therefore, when am user wants to acquire personal information of a plurality of other users, it is required to access the plurality of users so as to ask them to change the access restriction information. In this case, the user who wants to acquire personal information of the plurality of users has to know how to access the respective users. In contrast, when personal information of all users are managed by the management server 6 according to the present invention, a user who wants to acquire personal information of a plurality of users has to know only how to access the management server 6 and has not to know how to access respective users.

In order that the management server 6 can transmit a restriction removal inquiry message to user B having his/her own personal information and can receive a response from him/her, it is required that the client terminal of user B be connected to the Internet 11. If the client terminal of user B is not connected to the Internet 11, it is impossible to transmit the restriction removal inquiry message to the client terminal of user B. Thus, when the client terminal of user B is not connected to the Internet 11, the management server 6 may spool the restriction removal inquiry message and may transmit it to the client terminal of user B when the client terminal of user B is connected to the Internet 11. Alternatively, the management server 6 may transmit the restriction removal inquiry message in the form of an electronic mail.

In this case, there is a possibility that the client terminal of user A who has issued the retrieval request is not connected to the Internet when the client terminal of user B responds to the restriction removal inquiry after being connected to the Internet. However, if user B returns a restriction removal approval message in response to the restriction removal inquiry message, the management server 6 changes the access restriction information so that user A can access the personal information of user B when user A again transmits a request for retrieval of the personal information of user B. Thus, user A can acquire the personal information of user B.

If personal information is described in a file according to a format called vCard (Visiting Card) developed by IMC (Internet Mail Consortium), and if this file is attached to an electronic mail, a mailer on a receiving device may record the personal information described in the vCard file into the address table. Therefore, also in this case, a user may have personal information recorded in his/her address table without having to input personal information. However, when a vCard file is employed, the user has to specify whether to attach the vCard to an electronic mail each time he/she sends an electronic mail. This is troublesome for the user.

In contrast, when personal information of all users are managed by the management server 6 in the above-described manner according to the present invention, what is required for users is to simply respond to inquiry as to whether access to personal information is permitted. Thus, users have not to perform troublesome jobs to set the access restriction.

Figure 18:
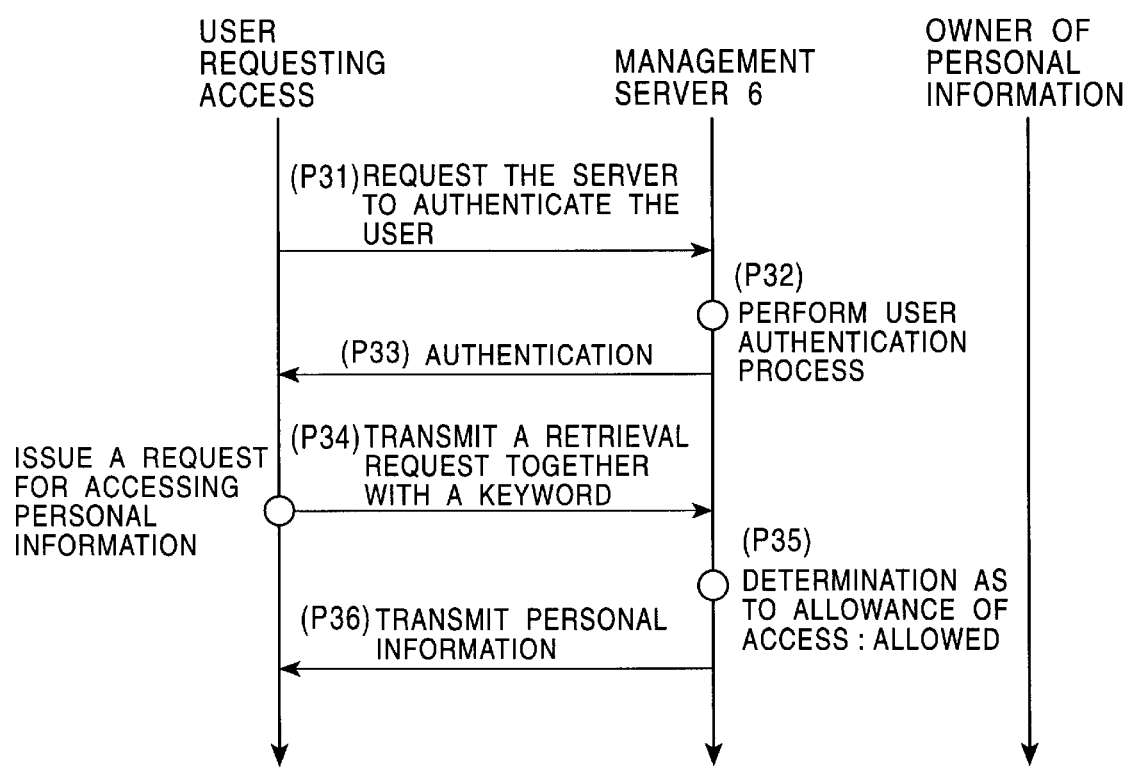
FIG. 18 is a schematic diagram illustrating a communication process between the management server and an access requester and an owner of personal information.
Figure 19:
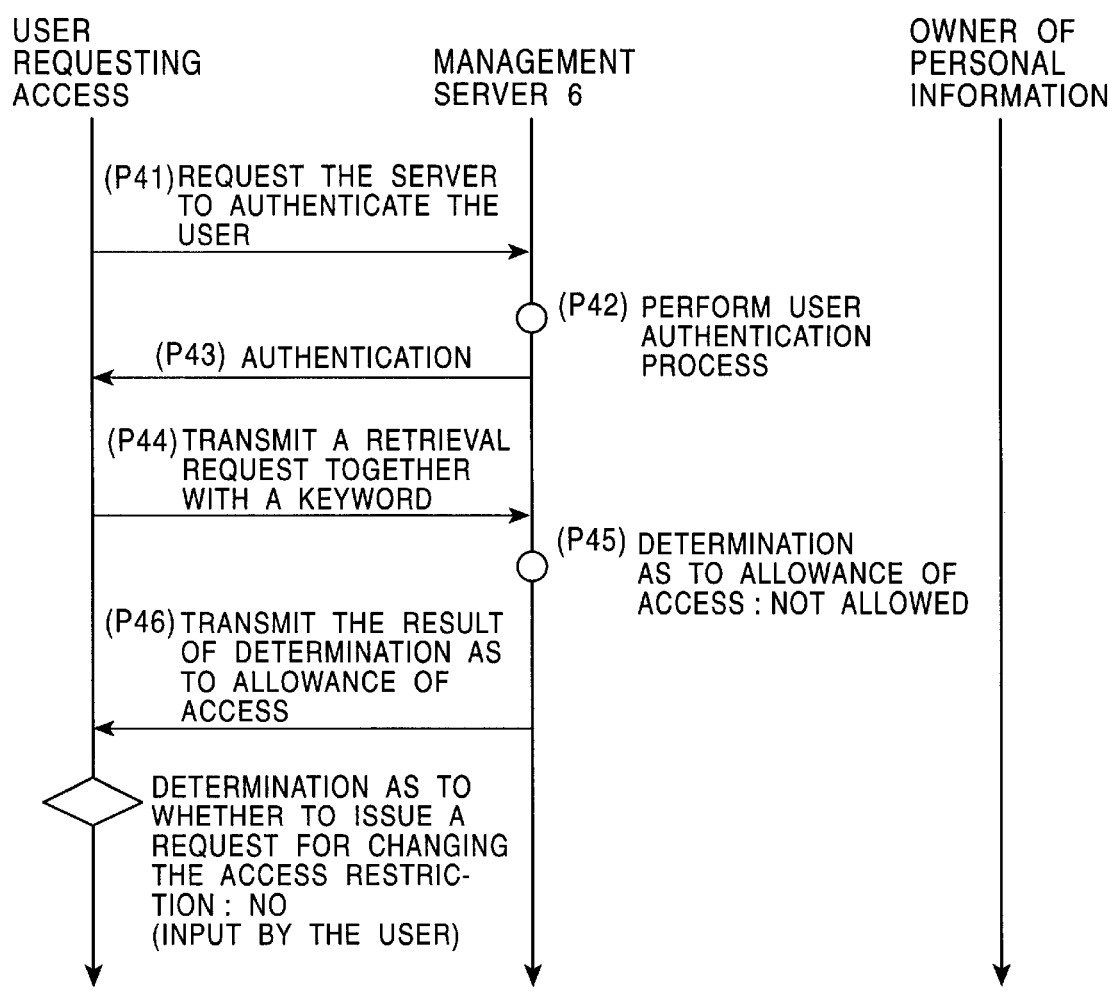
FIG. 19 is a schematic diagram illustrating a communication process between the management server and an access requester and an owner of personal information.
Figure 20:
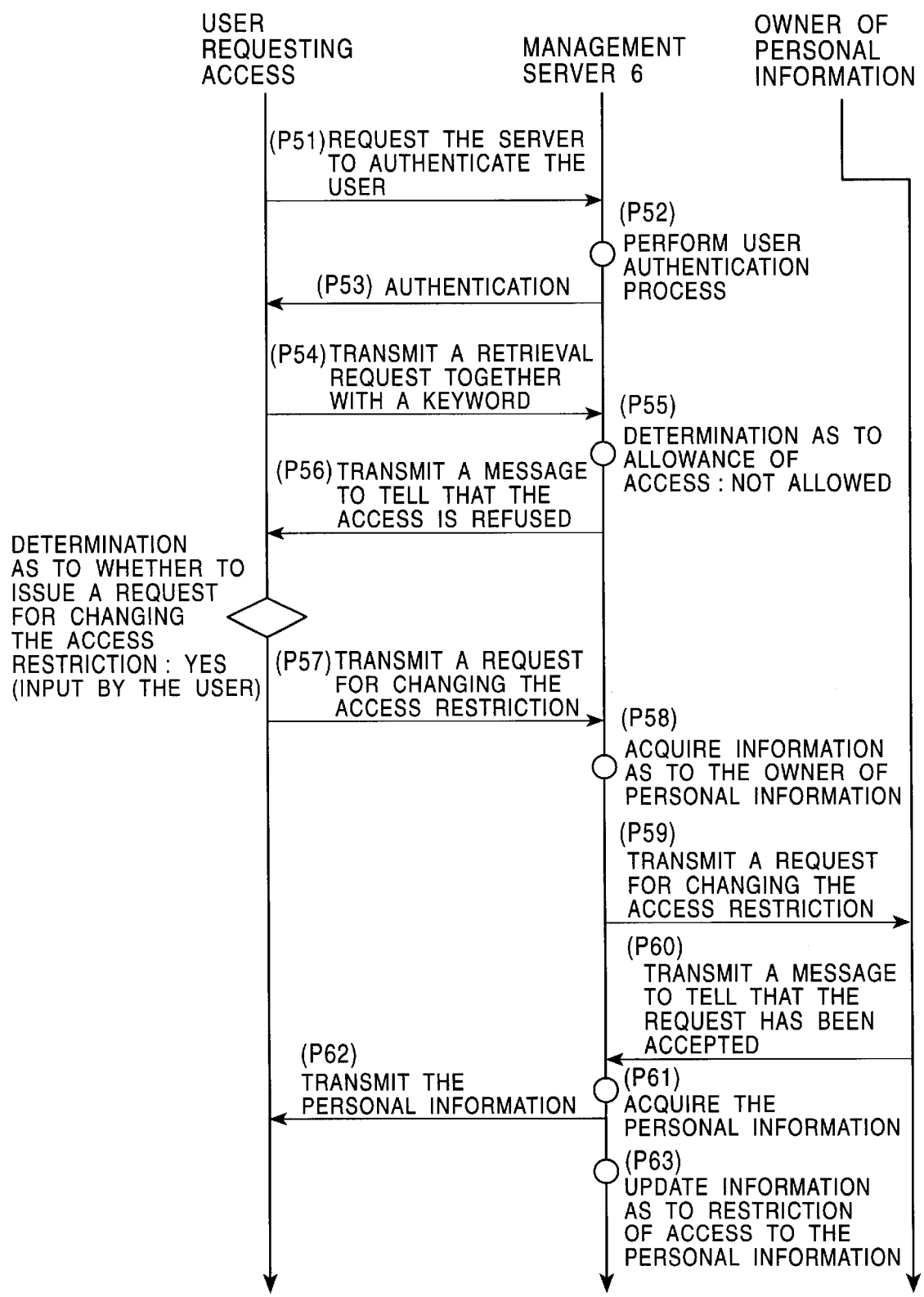
FIG. 20 is a schematic diagram illustrating a communication process between the management server and an access requester and an owner of personal information.

Referring now to FIGS. 18–20, the communication process is described in further detail below which is performed, during the personal information providing process, between the management server 6 and a client terminal (access requester) which has issued a retrieval request and between the management server 6 and a client terminal of a user (personal information owner) whose personal information is requested.

In the case where an access requester is permitted to access personal information of a personal information owner, that is, in the case where access restriction information associated with the personal information owner is set such that the access requester is permitted to access the personal information of the personal information owner, the access requester first transmits an authentication request to the management server 6 (P31 in FIG. 18) In response to the request, the management server 6 authenticates the access requester (P32), and the management server 6 returns the authentication result to the access requester (P33). If there is no problem in the authentication result,the access requester transmits a retrieval request together with a keyword to the management server 6 (P34).

In response to the retrieval request, the management, server 6 retrieves personal information which matches the keyword given by the access requester. The management server 6 then determines, on the basis of the access restriction information included in the personal information, whether the access requester is permitted to access that personal information (P35). In this specific example, the access requester is permitted to access the personal information of the personal information owner, and thus the management server 6 transmits the retrieved personal information to the access requester (P36).

Thus, in this case, the access requester can acquire the personal information of the personal information owner.

Now, the communication process is described for the case where access restriction information is set such that an access requester is not permitted to access personal information of personal information owner, and the access requester does not transmit a restriction removal request. In this case, as shown in FIG. 19, the access requester, first transmits an authentication request to the management server 6 (P41). In response to the request, the management server 6 authenticates the access requester (P42), and the management server 6 returns the authentication result to the access requester (P43). If there is no problem in the authentication result, the access requester transmits a retrieval request together with a keyword to the management server 6 (P44).

In response to the retrieval request, the management server 6 retrieves personal information which matches the keyword given by the access requester. The management server 6 then determines, on the basis of the access restriction information included in the personal information, whether the access requester is permitted to access that personal information (P45). In this specific example, the access requester is not permitted to access the personal information of the personal information owner, and thus the management server 6 transmits a refusal message to the access requester (P46).

In this case, because the access requester does not transmit a restriction removal request to the management server 6, the management server 6 does not transmit a restriction removal inquiry message to the personal information owner.

Therefore, in this case, the access requester cannot acquire the personal information of the personal information owner.

Now, we assume that access restriction information is set such that an access requester is not permitted to access the personal information of a personal information owner, and assume that the access requester transmits a restriction removal request. In this case, as shown in FIG. 20, the access requester first transmits an authentication request to the management server 6 (P51). In response to the request, the management server 6 authenticates the access requester (P52), and the management server 6 returns the authentication result to the access requester (P53). If there is no problem in the authentication result, the access requester transmits a retrieval request together with a keyword to the management server 6 (P54).

In response to the retrieval request, the management server 6 retrieves personal information which matches the keyword given by the access requester. The management server 6 then determines, on the basis of the access restriction information included in the personal information, whether the access requester is permitted to access that personal information (P55). In this specific example, the access requester is not permitted to access the personal information of the personal information owner, and thus the management server 6 transmits a refusal message to the access requester (P56).

The access requester then transmits a restriction removal request message to the management server 6 (P57). Upon reception of the restriction-removal request message, the management server 6 acquires information as to the personal information owner from the personal information. Stored in the personal information database 33 (P58), and the management server 6 transmits a restriction removal inquiry message to the detected personal information owner (P59).

If the personal information owner decides to give permission, as to access to his/her personal information, to the access requester, the personal information owner returns a restriction removal approval message, as a response to the restriction removal inquiry message, to the management server 6 (P60).

Upon reception of the restriction removal approval message, the management server 6 reads the personal information of the personal information owner from the personal information database 33 (P61) and transmits it to the access requester (P62). Furthermore, the management server 6 changes the access restriction information included in the personal information of the personal information owner such that the access requester is permitted to access the personal information.

In the personal information providing process described above with reference to FIG. 17, when the restriction removal approval message is received from the personal information owner, the access restriction information is changed. However, the access restriction information may not be changed when the restriction removal approval message is received.

FIG. 21 illustrates a communication process which is performed between the management server 6 and an access requester and between the management server 6 and a personal information owner, for the case where access restriction information is not changed when a restriction removal approval message is received from the personal information owner. The communication process shown in FIG. 21 is similar to that described above with reference to FIG. 20 except that the access restriction information is not changed (P63), and thus the process is not described in further detail herein.

In the example shown in FIG. 21, the access restriction information is not changed, although the personal information of the personal information owner is transmitted to the access requester. Thus, when the access requester again issues a request for retrieval of the personal information of the personal information owner, the supply of the personal information to the access requester is restricted. That is, in the case where the access restriction information is not changed even if the restriction removal approval messages is received from the personal information owner, the supply of the personal information to the access requester is allowed only at that time.

In the personal information providing process described above with reference to FIG. 17, whenever a restriction removal request message is received from an access requester, the management server 6 transmits a restriction removal inquiry message to a personal information owner. However, this may be burdensome for some personal information owners.

To avoid the above problem, the process may be performed such that when a restriction removal request message is received from an access requester who wants to access the personal information of a certain personal information owner, if a restriction removal inquiry has been transmitted in the past to the same personal information owner in response to a request issued from the same access requester, a restriction removal inquiry message is not transmitted to that personal information owner. Alternatively, a personal information owner may specify a particular access requester such that even when a restriction removal request message is transmitted from the specified access requester, a restriction removal inquiry message is not transmitted to the personal information owner.

In the process described above, the management server 6 changes the access restriction information, when the restriction removal approval message is received from the owner of personal information, that is, when the owner of personal information gives permission as to the change of the access restriction information. The change of the access restriction information may also be performed when a request is issued by the owner of personal information.

FIG. 22 illustrates an example of personal information described in the personal information database 33 in the management server 6.

In the personal information database 33 in the management server 6, personal information is described for each user as shown in FIG. 22A. A shown in FIG. 22B, the personal information of each user includes an address table, a mail box, a message box, and user authentication information. The mail box and the message box are assigned to each user when the user performs a personal information registration process and thus his/her personal information is recorded into the personal information database 33 The user authentication information includes, for example, user identification and a password.

As shown in FIG. 22C, the address table includes user registration information, access restriction information, and update notification information. Information input by a user in the personal information registration process is recorded as user registration information. Herein, information which is provided to another user in response to his/her request is limited to that recorded as the user registration information, because the other items of personal information include information which should not be open to any other user.

As shown in FIG. 22D, the user registration information includes a registered user name, first and second names (and pronunciation represented in kana characters), home telephone number, portable telephone number, pager number (Pocket-Bell number (Pocket-Bell is a trademark)), Internet electronic mail address (E-mail address), home facsimile number, home zip code, home address, company name, company telephone number, company facsimile number, section name, company address, notes, and communication terminal information list.

The communication terminal information list includes information as to the client terminal of the user. More specifically, as shown in FIG. 22E, the communication terminal information list includes information representing the type of the client terminal such as a computer or a portable telephone device, information representing the manner of accessing the client terminal (for example, the telephone number of a telephone line to which the client terminal is connected), and information representing available information media the client terminal can access.

The access restriction information may be set in common for all items of user registration information, or may be set separately for each item.

For example, as shown in FIG. 23, the access restriction information may be set for each item of the user registration information which is permitted to be accessed by another user.

In the specific example shown in FIG. 23, the access restriction information is set such that access permission of the registered user name, the first and second names, the home telephone number, the portable telephone number, the pager number, the E-mail address, and the communication terminal information list is given to user A and user B, and such that nobody (except for the owner) is permitted to access the home facsimile number, the home zip code, the home address, and the notes. Furthermore, the access restriction information describes that user A has permission to access the company name, the company telephone number, the company facsimile number, and the company address.

The update notification information (FIG. 22C) in the address table specifies users to whom updated user registration information is to be sent when updating is performed (or a message is sent to notify that the user registration information has been updated).

In the embodiment described above with reference to FIGS. 9 and 10, when user registration information is updated, the retrieval log is checked to detect users who have issued in the past a request for retrieval of that user registration information, and the updated user registration information (or a message telling that the user registration information has been updated) is sent to the detected users. Alternatively, the updated user registration information may also be sent to users specified by the update notification information.

The update notification information, as with the access restriction information, may be set in common for all items of user registration information, or may be set separately for each item.

FIG. 24 illustrates an example of update notification information which is set for each item of user registration information.

In the specific example shown in FIG. 24, the update notification information is set such that when a change occurs in any of items including the registered user name, the first and second names, the home telephone number, the portable telephone number, the pager number, the E-mail address, and the communication terminal information list, updated information is sent to user A and user B, and such that when a change occurs in the home facsimile number, the home zip code, the home address, or the notes, updated information is not sent to anybody. In the case where a change occurs in any of items including the company name, the company telephone number, the company facsimile number, and the company address, updated information is sent to user A.

The update notification information is basically set by the owner of personal information. However, the update notification information may also be set by the management server 6 in such a manner that users who have issued in the past a request for retrieval of the user registration information are detected from the retrieval log and the detected users are specified by the update notification information.

The processes described above may be performed by either hardware or software. When the processes are performed by software, a software program is installed on a computer which is provided as dedicated hardware in for example the portable telephone device 5, or is installed on a general-purpose computer capable of performing various processes in accordance with various programs installed thereon, such as computers 1–4 or the management server 6

A storage medium for storing the program which is to be installed onto a computer and executed by the computer to perform the above process is described below with reference to FIG. 25.

Figure 25A:
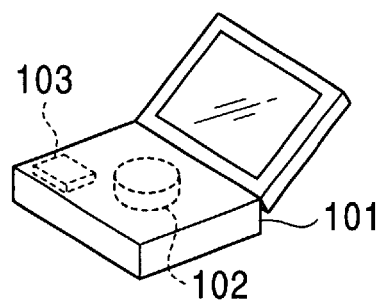
FIG. 25A is a schematic diagram illustrating the appearance of a computer in which a program for executing a process according to the present invention is installed.
Figure 25B:
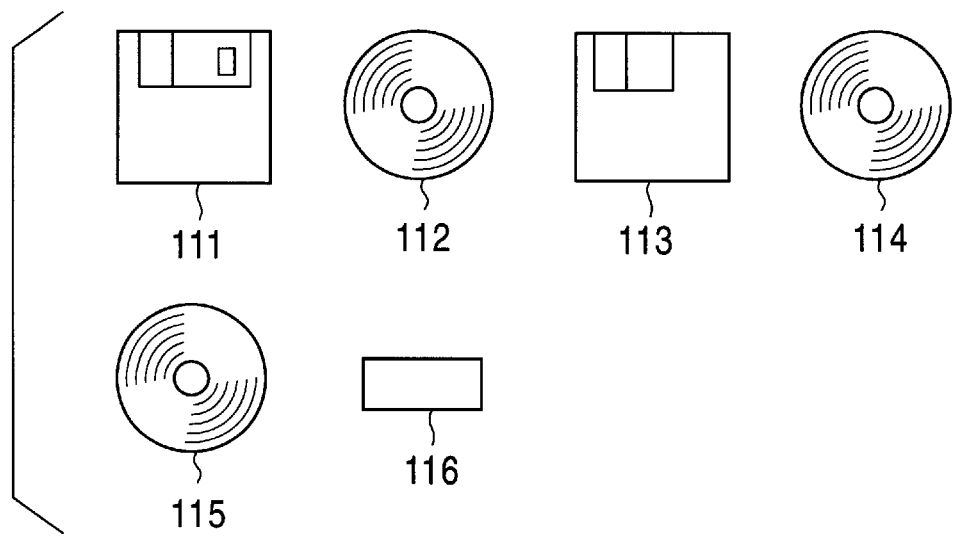
FIG. 25B is a schematic diagram illustrating various storage media for storing a program used to execute a process according to the present invention.

One way to provide the program to a user is to preinstall the program on a storage medium mounted on a personal computer, such as a hard disk 102 in a personal computer 101 or a semiconductor memory 103, as shown in FIG. 25A.

Another way to provide the program is to temporarily or permanently store the program on a storage medium such as a floppy disk 111, a CD-ROM (compact disc read only memory) 112, an MO (Magnetooptical) disk 113, a DVD (digital versatile disk) 114, magnetic disk 115, or a semiconductor memory 116 and supply it in the form of package software.

Figure 25C:
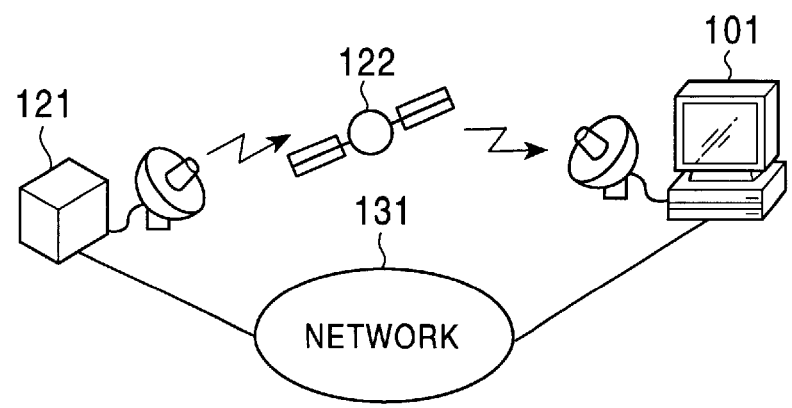
FIG. 25C is a schematic diagram illustrating a process for supplying a program used to execute a process according to the present invention.

The program may be downloaded onto the hard disk 102 or the like of the personal computer 101 from a downloading service site 121 via a wireless communication medium such as a digital broadcasting satellite 122 or via a network 131 such as a local area network or the Internet, as shown in FIG. 25C.

In the present invention, the term "medium" is used in a broad sense to describe all these media.

In the present invention, it is not necessarily required that a process be described in a program in such a manner that steps of the process are performed in a time sequential fashion in the order described in a flow chart, but steps of the process may be performed in a parallel or separate fashion (parallel processing or object processing).

Figure 26:
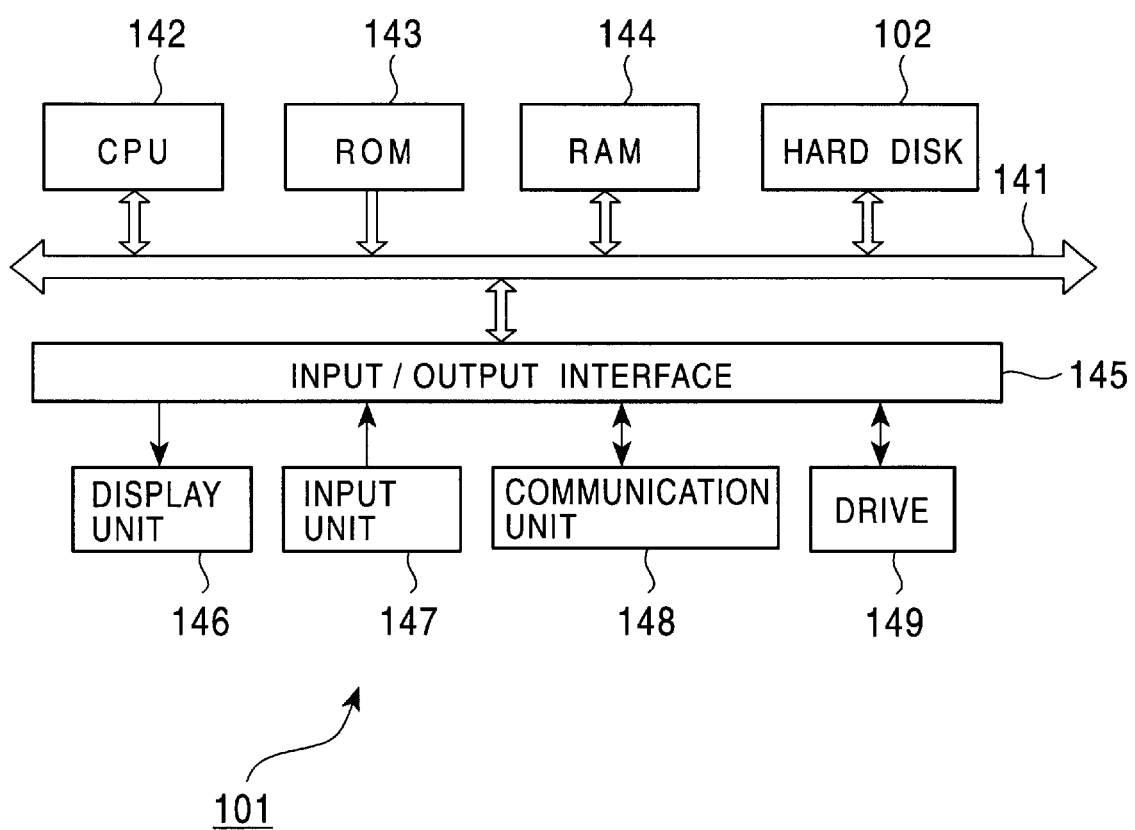
FIG. 26 is a block diagram illustrating an example of a configuration of a computer for executing a process according to the present invention.

FIG. 26 illustrates an example of a configuration of the computer 101 shown in FIG. 25A or 25C.

As shown in FIG. 16, the computer 101 includes a CPU (Central Processing Unit) 142. The CPU 142 is connected to an input/output interface 145 via a bus 141. When a user inputs a command by operating an input device 147 such as a keyboard or a mouse, the command is transferred to the CPU 142 via the input/output interface 145. In accordance with the command, the CPU 142 executes a program stored in the ROM (Read Only Memory) 143 corresponding to the semiconductor memory 103 shown in FIG. 25A. The CPU 142 may also execute a program after loading it into a RAM (random access memory) 144 from the hard disk 102, wherein the program loaded from the hard disk 102 into the RAM 144 may be preinstalled on the hard disk 102 or installed thereon after being received by a communication unit 148 via a satellite 122 or a network 131 or otherwise installed after being read from a floppy disk 111, a CD-ROM 112, an MO disk 113, a DVD 114, or a magnetic disk 115 loaded on a drive 149. The CPU 142 may display a result of the process, as required, on a display 146 such as an LCD (liquid crystal display) via the input/output interface 145.

In the case where a program used by a client-terminal to perform the above-described processes is supplied via a semiconductor memory such as a memory card or an IC (integrate circuit) card, the program stored in the semiconductor memory or the IC card may be automatically executed when it is inserted into the client terminal thereby accessing the management server 6 to acquire desired personal information.

What is claimed is:

1. An information processing apparatus for acquiring personal information of any of a plurality of owners of personal information from an information providing apparatus for providing said personal information, the personal information of each owner including a plurality of items, said information processing apparatus comprising:

personal information storage means for storing personal information of a plurality of owners;

registration means for registering said personal information of said owners into said personal information storage means;

retrieval requesting means for transmitting a retrieval request command together with a keyword corresponding to an item of said personal information of any one of said plurality of owners;

retrieval history means for storing a retrieval history of retrieval performed in response to the retrieval request, wherein the retrieval history includes at least an identifier of said information processing apparatus requesting said retrieval request and an identifier of said information providing apparatus; and checking means for checking said retrieval history and whether said personal information of said information providing apparatus has been updated or not.

2. An information processing apparatus according to claim 1, wherein said personal information receiving means receives personal information that has been permitted by the owner of the personal information.

3. An information processing apparatus according to claim 1, further comprising:

inquiry requesting means for performing inquiry in such a manner that when said personal information requesting means requests said information providing apparatus to provide said personal information, if the providing of said personal information is not permitted or is restricted, said inquiry requesting means requests said information providing means to inquire of the owner of said personal information whether or not to give permission as to the providing of said personal information.

4. An information processing method for acquiring personal information of any of a plurality of owners of personal information from an information providing apparatus for providing said personal information, the personal information of each owner including a plurality of items, said information processing method comprising the steps of:

storing personal information of a plurality of owners in a personal information storage means;

registering said personal information of said owners into said personal information storage means;

transmitting a retrieval request command together with a keyword corresponding to an item of said personal information of any one of said plurality of owners;

storing a retrieval history of retrieval performed in response to the retrieval request, wherein the retrieval history includes at least an identifier of said information processing apparatus requesting said retrieval request and an identifier of said information providing apparatus; and checking said retrieval history and whether said personal information of said information providing apparatus has been updated or not.

5. A storage medium on which a program for performing an information process to acquire personal information of any of a plurality of owners of personal information from an information providing apparatus for providing said personal information, the personal information of each owner including a plurality of items, said program comprising the steps of:

storing personal information of a plurality of owners in a personal information storage means;

registering said personal information of said owners into said personal information storage means;

transmitting a retrieval request command together with a keyword corresponding to an item of said personal information of any one of said plurality of owners;

storing a retrieval history of retrieval performed in response to the retrieval request, wherein the retrieval history includes at least an identifier of said information processing apparatus requesting said retrieval request and an identifier of said information providing apparatus; and checking said retrieval history and whether said personal information of said information providing apparatus has been updated or not.

6. An information processing apparatus for providing personal information of any of a plurality of owners of personal information, the personal information including a plurality of items, in response to a request from a client terminal, said information processing apparatus comprising:

keyword receiving means for receiving, from said client terminal, a keyword which is used in retrieval of an item of said personal information of any of said plurality of owners;

retrieval means for retrieving personal information which matches said keyword, from a personal information database which stores said personal information; and updated personal information providing means for, when personal information is stored in said personal information database is updated, providing information as to updating of personal information to a client terminal which has requested retrieval of said personal information referring to a retrieval history database which stores an identifier of said client terminal requesting retrieval and an identifier of said information providing apparatus.

7. An information processing apparatus according to claim 6, further comprising retrieval history storage means for storing the retrieval history database of the history of retrieval of personal information performed in accordance with a keyword sent from said client terminal, wherein said updated personal information providing means detects, on the basis of said retrieval history, a client terminal which has issued a request for retrieval of said personal information in the past before said personal information was updated, and said updated personal information providing means provides information as to updating of said personal information to the detected client terminal.

8. An information processing method for providing personal information of any of a plurality of owners of personal information, the personal information including a plurality of items, in response to a request from a client terminal, said information processing method comprising the steps of:

receiving, from said client terminal, a keyword which is used in retrieval of an item of said personal information of any one of said plurality of owners;

retrieving personal information which matches said keyword, from a personal information database which stores said personal information; and when personal information stored in said personal information database is updated, providing information as to updating of personal information to a client terminal which has requested retrieval of said personal information referring to a retrieval history database which stores an identifier of said client terminal requesting retrieval and an identifier of said information providing apparatus.

9. A storage medium on which a program for performing an information process to provide personal information of any of a plurality of owners of personal information, the personal information including a plurality of items, in response to a request from a client terminal, said program comprising the steps of:

receiving, from said client terminal, a keyword which is used in retrieval of an item of said personal information of any one of said plurality of owners;

retrieving personal information which matches said keyword, from a personal information database which stores said personal information; and when personal information stored in said personal information database is updated, providing information as to updating of personal information to a client terminal which has requested retrieval of said personal information referring to a retrieval history database which stores an identifier of said client terminal requesting retrieval and an identifier of said information providing apparatus.

10. An information processing apparatus comprising:

an information providing apparatus for providing personal information of any of a plurality of owners of personal information, the personal information comprising a plurality of items; and a client terminal for requesting said information providing apparatus to provide said personal information, said client terminal comprising:
personal information storage means for storing personal information of a plurality of owners;
registration means for registering said personal information of said owners into said personal information storage means;
retrieval requesting means for transmitting a retrieval request command together with a keyword corresponding to an item of said personal information of any one of said plurality of owners;
retrieval history means for storing a retrieval history of retrieval performed in response to the retrieval request, wherein the retrieval history includes at least an identifier of said information processing apparatus requesting said retrieval request and an identifier of said information providing apparatus; and
checking means for checking said retrieval history and whether said personal information of said information providing apparatus has been updated or not, said information providing apparatus comprising:
keyword receiving means for receiving, from said client terminal, the keyword which is used in retrieval of said personal information;
retrieval means for retrieving personal information which matches said keyword, from a personal information database which stores said personal information; and
when personal information stored in said personal information database is updated, providing information as to updating of personal information to a client terminal which has requested retrieval of said personal information referring to a retrieval history database which stores an identifier of said client terminal requesting retrieval and an identifier of said information providing apparatus.

11. An information processing apparatus for providing personal information of any of a plurality of owners of personal information, the personal information including a plurality of items, in response to a request from a client terminal, said information processing apparatus comprising:

request receiving means for receiving a request for an item of said personal information of any one of said plurality of owners from said client terminal;

determination means for determining whether providing personal information requested from said client terminal is permitted or restricted, on the basis of permission/restriction information representing whether providing said personal information is permitted or restricted;

inquiry means for performing inquiry in such a manner that when said client terminal issues a request for personal information, if the providing of said personal information is not permitted or is restricted, said inquiry means inquires of the owner of said personal information whether or not to give permission as to the providing of said personal information;

personal information providing means for providing personal information to said client terminal when the owner of said personal information gives permission to provide said personal information;

update request receiving means for receiving an update request for determining whether said personal information has been updated;

checking means for determining whether said personal information has been updated referring to a retrieval history database which stores an identifier of said client terminal from which the request was received and an identifier of said information providing apparatus; and update providing means for providing updated personal information when it is determined that the personal information has been updated.

12. An information processing apparatus according to claim 11, wherein when providing of personal information requested by said client terminal is restricted or not permitted, if said client terminal issues a request for inquiring of the owner of said personal information whether providing of said personal information is permitted, said inquiry means performs said inquiry.

13. An information processing apparatus according to claim 11, further comprising changing means for changing permission/restriction information in such a manner that when the owner of said personal information gives permission as to the providing of said personal information, said changing means changes the permission/restriction information associated with said personal information in accordance with said permission.

14. An information processing apparatus according to claim 11, further comprising changing means for changing said permission/restriction information in response to a request issued by the owner of said personal information.

15. An information processing apparatus according to claim 11, wherein in said permission/restriction information, a user who is permitted or not permitted to acquire personal information is specified for each of said personal information.

16. An information processing apparatus according to claim 11, wherein in said permission/restriction information, personal information which is permitted or not permitted to be approved is specified for each user.

17. An information processing method for providing personal information of any of a plurality of owners of personal information, the personal information including a plurality of items, in response to a request from a client terminal, said information processing method comprising the steps of:

receiving a request for an item of said personal information of any one of said plurality of owners from said client terminal;

determining whether providing personal information requested from said client terminal is permitted or restricted, on the basis of permission/restriction information representing whether providing said personal information is permitted or restricted;

when said client terminal issues a request for personal information, if the providing of said personal information is not permitted or is restricted, inquiring of the owner of said personal information whether or not to give permission as to the providing of said personal information;

providing personal information to said client terminal when the owner of said personal information gives permission to provide said personal information;

receiving an update request for determining whether said personal information has been updated;

determining whether said personal information has been updated referring to a retrieval history database which stores an identifier of said client terminal from which the request was received and an identifier of said information providing apparatus; and providing updated personal information when it is determined that the personal information has been updated.

18. A storage medium having a program for performing an information process to provide personal information of any of a plurality of owners of personal information, the personal information including a plurality of items, in response to a request from a client terminal, said program comprising the steps of:

receiving a request for an item of said personal information of any one of said plurality of owners from said client terminal;

determining whether providing personal information requested from said client terminal is permitted or restricted, on the basis of permission/restriction information representing whether providing said personal information is permitted or restricted;

when said client terminal issues a request for personal information, if the providing of said personal information is not permitted or is restricted, inquiring of the owner of said personal information whether or not to give permission as to the providing of said personal information;

providing personal information to said client terminal when the owner of said personal information gives permission to provide said personal information;

receiving an update request for determining whether said personal information has been updated;

determining whether said personal information has been updated referring to a retrieval history database which stores an identifier of said client terminal from which the request was received and an identifier of said information providing apparatus; and providing updated personal information when it is determined that the personal information has been updated.

19. An information processing apparatus for acquiring personal information from an information providing apparatus for providing personal information of any of a plurality of owners of the personal information, the personal information including a plurality of items, said information processing apparatus comprising:

personal information storage means for storing personal information of a plurality of owners;

registration means for registering said personal information of said owners into said personal information storage means;

retrieval requesting means for transmitting a retrieval request command together with a keyword corresponding to an item of said personal information of any one of said plurality of owners;

retrieval history means for storing a retrieval history of retrieval performed in response to the retrieval request, wherein the retrieval history includes at least an identifier of said information processing apparatus requesting said retrieval request and an identifier of said information providing apparatus;

checking means for checking said retrieval history and whether said personal information of said information providing apparatus has been updated or not; and inquiry requesting means for performing inquiry in such a manner that when said personal information requesting means requests said information providing apparatus to provide said personal information, if the providing of said personal information is not permitted or is restricted, said inquiry requesting means requests said information providing means to inquire of the owner of said personal information whether or not to give permission as to the providing of said personal information, wherein if said personal information has been updated, said registration means updates personal information stored in said personal information storage means, with the updated personal information provided from said information providing apparatus.

20. An information processing method for acquiring personal information from an information providing apparatus for providing personal information of any of a plurality of owners of the personal information, the personal information including a plurality of items, said information processing method comprising the steps of:

storing personal information of a plurality of owners in a personal information storage means;

registering said personal information of said owners into said personal information storage means;

transmitting a retrieval request command together with a keyword corresponding to an item of said personal information of any one of said plurality of owners;

storing a retrieval history of retrieval performed in response to the retrieval request, wherein the retrieval history includes at least an identifier of said information processing apparatus requesting said retrieval request and an identifier of said information providing apparatus;

checking said retrieval history and whether said personal information of said information providing apparatus has been updated or not;

updating personal information stored in said personal information storage means, with the updated personal information provided from said information providing apparatus, responsive to said personal information having been updated; and performing inquiry in such a manner that when a request is issued to said information providing apparatus to provide said personal information, if the providing of said personal information is not permitted or is restricted, a request is issued to said information providing means to inquire of the owner of said personal information whether or not to give permission as to the providing of said personal information.

21. A storage medium on which a program for performing an information process to acquire personal information from an information providing apparatus for providing personal information of any of a plurality of owners of personal information, the personal information including a plurality of items, said program comprising the steps of:

storing personal information of a plurality of owners in a personal information storage means;

registering said personal information of said owners into said personal information storage means;

transmitting a retrieval request command together with a keyword corresponding to an item of said personal information of any one of said plurality of owners;

storing a retrieval history of retrieval performed in response to the retrieval request, wherein the retrieval history includes at least an identifier of said information processing apparatus requesting said retrieval request and an identifier of said information providing apparatus;

checking said retrieval history and whether said personal information of said information providing apparatus has been updated or not; and updating personal information stored in said personal information storage means, with the updated personal information provided from said information providing apparatus, responsive to said personal information having been updated; and performing inquiry in such a manner that when a request is issued to said information providing apparatus to provide said personal information, if the providing of said personal information is not permitted or is restricted, a request is issued to said information providing means to inquire of the owner of said personal information whether or not to give permission as to the providing of said personal information.

22. An information processing apparatus comprising:

an information providing apparatus for providing personal information of any of a plurality of owners of personal information, the personal information including a plurality of items; and a client terminal for requesting said information providing apparatus to provide an item of said personal information of any one of said plurality of owners, said information providing apparatus comprising:

request receiving means for receiving a request for said personal information from said client terminal;

determination means for determining whether providing personal information requested from said client terminal is permitted or restricted, on the basis of permission/restriction information representing whether providing said personal information is permitted or restricted;

inquiry means for performing inquiry in such a manner that when said client terminal issues a request for personal information, if the providing of said personal information is not permitted or restricted, said inquiry means inquires of the owner of said personal information whether or not to give permission as to the providing of said personal information; and personal information providing means for providing personal information to said client terminal when the owner of said personal information gives permission to provide said personal information, said client terminal comprising:

personal information storage means for storing personal information of a plurality of owners;

registration means for registering said personal information of said owners into said personal information storage means;

retrieval requesting means for transmitting a retrieval request command together with a keyword corresponding to an item of said personal information of any one of said plurality of owners;

retrieval history means for storing a retrieval history of retrieval performed in response to the retrieval request, wherein the retrieval history includes at least an identifier of said information processing apparatus requesting said retrieval request and an identifier of said information providing apparatus; and checking means for checking said retrieval history and whether said personal information of said information providing apparatus has been updated or not.

23. An information processing apparatus for acquiring personal information from an information providing apparatus for providing personal information of any of a plurality of owners of personal information, the personal information including a plurality of items, said information processing apparatus comprising:

personal information storage means for storing personal information of a plurality of owners;

registration means for registering said personal information of said owners into said personal information storage means;

retrieval requesting means for transmitting a retrieval request command together with a keyword corresponding to an item of said personal information of any one of said plurality of owners;

retrieval history means for storing a retrieval history of retrieval performed in response to the retrieval request, wherein the retrieval history includes at least an identifier of said information processing apparatus requesting said retrieval request and an identifier of said information providing apparatus; and checking means for checking said retrieval history and whether said personal information of said information providing apparatus has been updated or not;

wherein when the personal information has been updated, said registration means updates personal information corresponding to said update.

* * * * *